United States Patent
Ishikawa et al.

(10) Patent No.: US 11,091,637 B2
(45) Date of Patent: Aug. 17, 2021

(54) POLYCARBONATE-POLYORGANO-SILOXANE COPOLYMER, FLAME-RETARDANT POLYCARBONATE RESIN COMPOSITION INCLUDING SAME, AND MOLDED PRODUCT THEREOF

(71) Applicant: IDEMITSU KOSAN CO., LTD., Tokyo (JP)

(72) Inventors: Yasuhiro Ishikawa, Ichihara (JP); Tomoko Abe, Tokyo (JP); Takafumi Akimoto, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 6 days.

(21) Appl. No.: 16/490,053

(22) PCT Filed: Mar. 1, 2018

(86) PCT No.: PCT/JP2018/007902
§ 371 (c)(1),
(2) Date: Aug. 29, 2019

(87) PCT Pub. No.: WO2018/159788
PCT Pub. Date: Sep. 7, 2018

(65) Prior Publication Data
US 2020/0010683 A1 Jan. 9, 2020

(30) Foreign Application Priority Data

Mar. 1, 2017 (JP) ............................. JP2017-038842

(51) Int. Cl.

| | |
|---|---|
| *C08L 83/10* | (2006.01) |
| *C08G 77/448* | (2006.01) |
| *C08K 5/42* | (2006.01) |
| *C08K 5/523* | (2006.01) |
| *B29C 45/00* | (2006.01) |
| *B29K 96/04* | (2006.01) |

(52) U.S. Cl.
CPC ............ *C08L 83/10* (2013.01); *C08G 77/448* (2013.01); *C08K 5/42* (2013.01); *C08K 5/523* (2013.01); *B29C 45/0001* (2013.01); *B29K 2096/04* (2013.01); *C08L 2201/02* (2013.01)

(58) Field of Classification Search
CPC ...... C08L 83/10; C08L 2201/02; C08L 69/00; C08G 77/448; C08G 64/186
See application file for complete search history.

(56) References Cited

U.S. PATENT DOCUMENTS

| | | | |
|---|---|---|---|
| 2006/0199879 A1 | 9/2006 | Agarwal | |
| 2013/0261235 A1* | 10/2013 | Minemura | ........... C08G 77/448 524/165 |
| 2016/0017102 A1 | 1/2016 | Yamada | |
| 2018/0171108 A1 | 6/2018 | Yamada et al. | |
| 2019/0002652 A1* | 1/2019 | Sun | ......................... C08K 7/14 |

FOREIGN PATENT DOCUMENTS

| | | |
|---|---|---|
| CN | 101133125 A | 2/2008 |
| CN | 105026463 A | 11/2015 |
| CN | 107709460 A | 2/2018 |
| JP | 2662310 B2 | 10/1997 |
| JP | 2011-021127 A | 2/2011 |
| JP | 2012-246390 A | 12/2012 |
| JP | 2014-172938 A | 9/2014 |
| WO | WO-2015/087595 A1 | 6/2015 |
| WO | WO-2015/151346 A1 | 10/2015 |
| WO | WO-2015/166381 A1 | 11/2015 |
| WO | WO-2016/203916 A1 | 12/2016 |
| WO | WO-2016/203917 A1 | 12/2016 |
| WO | WO-2017/019969 A1 | 2/2017 |

OTHER PUBLICATIONS

International Searching Authority, "International Search Report" issued in connection with International Patent Application No. PCT/JP2018/007902, dated Apr. 10, 2018.
International Searching Authority, "Written Opinion," issued in connection with International Patent Application No. PCT/JP2018/007902, dated Apr. 10, 2018.
Chinese Office Action issued in corresponding Application No. 201880014827.4 dated Jun. 4, 2021.

* cited by examiner

*Primary Examiner* — Robert S Jones, Jr.
(74) *Attorney, Agent, or Firm* — Foley & Lardner LLP

(57) ABSTRACT

Provided is a polycarbonate-polyorganosiloxane copolymer including polycarbonate blocks (A-1) each formed of a specific repeating unit and polyorganosiloxane blocks (A-2) each containing a specific repeating unit, wherein the polycarbonate-polyorganosiloxane copolymer satisfies the following expression (F1a):

$$15 \leq wM1 \qquad (F1a)$$

wherein wM1 represents the average content of the polyorganosiloxane blocks (A-2) in polycarbonate-polyorganosiloxane copolymers each having a molecular weight determined by using a polycarbonate as a conversion reference of from 56,000 or more to 200,000 or less among polycarbonate-polyorganosiloxane copolymers obtained through the separation of the polycarbonate-polyorganosiloxane copolymer by gel permeation chromatography.

34 Claims, 3 Drawing Sheets

POLYCARBONATE-POLYORGANO-SILOXANE COPOLYMER, FLAME-RETARDANT POLYCARBONATE RESIN COMPOSITION INCLUDING SAME, AND MOLDED PRODUCT THEREOF

RELATED APPLICATIONS

The present application claims priority under 37 U.S.C. § 371 to International Patent Application No. PCT/JP2018/007902, filed Mar. 1, 2018, which claims priority to and the benefit of Japanese Patent Application No. 2017-038842, filed on Mar. 1, 2017. The contents of these applications are hereby incorporated by reference in their entireties.

TECHNICAL FIELD

The present invention relates to a polycarbonate-polyorganosiloxane copolymer, a flame-retardant polycarbonate-based resin composition including the copolymer, and a molded article of the composition.

BACKGROUND ART

A polycarbonate-polyorganosiloxane copolymer (hereinafter sometimes abbreviated as "PC-POS copolymer") has been attracting attention because of its excellent properties, such as high impact resistance, chemical resistance, and flame retardancy. Accordingly, the polycarbonate-polyorganosiloxane copolymer has been expected to be widely utilized in various fields, such as the field of electrical and electronic equipment and the field of automobiles. In particular, the utilization of the polycarbonate-polyorganosiloxane copolymer in casings for a cellular phone, a mobile personal computer, a digital camera, a video camera, an electric tool, a communication base station, a battery, and the like, and in other commodities has been expanding.

In the usual case, a homopolycarbonate using 2,2-bis(4-hydroxyphenyl)propane [common name: bisphenol A] as a dihydric phenol serving as a raw material has been generally used as a typical polycarbonate. A polycarbonate-polyorganosiloxane copolymer using a polyorganosiloxane as a copolymerizable monomer has been known for improving the physical properties of the homopolycarbonate, such as flame retardancy and impact resistance (Patent Document 1).

Examples of an approach to further improving the impact resistance of a polycarbonate resin containing the polycarbonate-polyorganosiloxane copolymer may include an approach involving using a polyorganosiloxane having a long chain length, and an approach involving increasing the amount of the polyorganosiloxane in the polycarbonate-polyorganosiloxane copolymer as described in Patent Documents 2 and 3.

CITATION LIST

Patent Document

Patent Document 1: JP 2662310 B2
Patent Document 2: JP 2011-21127 A
Patent Document 3: JP 2012-246390 A

SUMMARY OF INVENTION

Technical Problem

An object of the present invention is to provide a polycarbonate-polyorganosiloxane copolymer having impact resistance more excellent than that of a related-art polycarbonate-based resin, a flame-retardant polycarbonate-based resin composition including the copolymer, and a molded article of the composition.

Solution to Problem

The inventors of the present invention have found that, when a polycarbonate-polyorganosiloxane copolymer whose polyorganosiloxane block concentration in a specific molecular weight region is equal to or more than a certain value is used, a polycarbonate-polyorganosiloxane copolymer having more excellent impact resistance, a flame-retardant polycarbonate-based resin composition including the copolymer, and a molded article of the composition are obtained without the extension of the chain length of a polyorganosiloxane block or an increase in content thereof.

That is, the present invention relates to the following items [1] to [34].

[1] A polycarbonate-polyorganosiloxane copolymer, comprising:
polycarbonate blocks (A-1) each formed of a repeating unit represented by the following general formula (I); and
polyorganosiloxane blocks (A-2) each containing a repeating unit represented by the following general formula (II),
wherein the polycarbonate-polyorganosiloxane copolymer satisfies the following expression (F1a):

$$15 \leq wM1 \tag{F1a}$$

wherein wM1 represents an average content (mass %) of the polyorganosiloxane blocks (A-2) in polycarbonate-polyorganosiloxane copolymers each having a molecular weight determined by using a polycarbonate as a conversion reference of from 56,000 or more to 200,000 or less among polycarbonate-polyorganosiloxane copolymers obtained through separation of the polycarbonate-polyorganosiloxane copolymer by gel permeation chromatography;

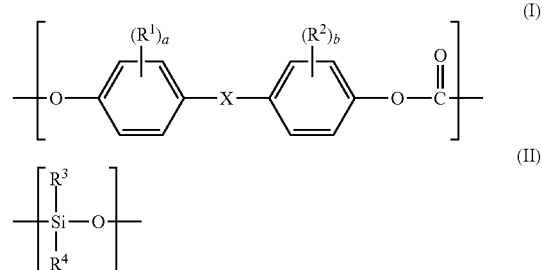

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

[2] The polycarbonate-polyorganosiloxane copolymer according to the above-mentioned item [1], wherein the polycarbonate-polyorganosiloxane copolymer satisfies the following expression (F1a'):

$$13 \leq wM2 \quad (F1a')$$

wherein wM2 represents an average content (mass %) of the polyorganosiloxane blocks (A-2) in polycarbonate-polyorganosiloxane copolymers each having a molecular weight determined by using the polycarbonate as a conversion reference of from 16,000 or more to less than 56,000 among the polycarbonate-polyorganosiloxane copolymers obtained through the separation of the polycarbonate-polyorganosiloxane copolymer by the gel permeation chromatography.

[3] The polycarbonate-polyorganosiloxane copolymer according to the above-mentioned item [1] or [2], wherein the polycarbonate-polyorganosiloxane copolymer satisfies the following expression (F1b):

$$100 < wM1/wA \times 100 \quad (F1b)$$

wherein wM1 is as described above, and wA represents an average content (mass %) of the polyorganosiloxane blocks (A-2) in the polycarbonate-polyorganosiloxane copolymer.

[4] The polycarbonate-polyorganosiloxane copolymer according to anyone of the above-mentioned items [1] to [3], wherein the polycarbonate-polyorganosiloxane copolymer satisfies the following expression (F2):

$$wM2 < wM1 \quad (F2)$$

wherein wM1 and wM2 are as described above.

[5] The polycarbonate-polyorganosiloxane copolymer according to anyone of the above-mentioned items [1] to [4], wherein the polycarbonate-polyorganosiloxane copolymer satisfies the following expression (F3):

$$wM3 < wM2 \quad (F3)$$

wherein wM2 is as described above, and wM3 represents an average content (mass %) of the polyorganosiloxane blocks (A-2) in polycarbonate-polyorganosiloxane copolymers each having a molecular weight determined by using the polycarbonate as a conversion reference of from 4,500 or more to less than 16,000 among the polycarbonate-polyorganosiloxane copolymers obtained through the separation of the polycarbonate-polyorganosiloxane copolymer by the gel permeation chromatography.

[6] The polycarbonate-polyorganosiloxane copolymer according to anyone of the above-mentioned items [1] to [5], wherein the polycarbonate-polyorganosiloxane copolymer satisfies the following expression (F4a):

$$50 \leq nM1 \quad (F4a)$$

wherein nM1 represents an average chain length of the polyorganosiloxane blocks (A-2) in the polycarbonate-polyorganosiloxane copolymers each having a molecular weight determined by using the polycarbonate as a conversion reference of from 56,000 or more to 200,000 or less among the polycarbonate-polyorganosiloxane copolymers obtained through the separation of the polycarbonate-polyorganosiloxane copolymer by the gel permeation chromatography.

[7] The polycarbonate-polyorganosiloxane copolymer according to anyone of the above-mentioned items [1] to [6], wherein the polycarbonate-polyorganosiloxane copolymer satisfies the following expression (F4b):

$$100 < nM1/nA \times 100 \quad (F4b)$$

wherein nM1 is as described above, and nA represents an average chain length of the polyorganosiloxane blocks (A-2) in the polycarbonate-polyorganosiloxane copolymer.

[8] The polycarbonate-polyorganosiloxane copolymer according to anyone of the above-mentioned items [1] to [7], wherein the polycarbonate-polyorganosiloxane copolymer satisfies the following expression (F5):

$$nM2 < nM1 \quad (F5)$$

wherein nM1 is as described above, and nM2 represents an average chain length of the polyorganosiloxane blocks (A-2) in polycarbonate-polyorganosiloxane copolymers each having a molecular weight determined by using the polycarbonate as a conversion reference of from 16,000 or more to less than 56,000 among the polycarbonate-polyorganosiloxane copolymers obtained through the separation of the polycarbonate-polyorganosiloxane copolymer by the gel permeation chromatography.

[9] The polycarbonate-polyorganosiloxane copolymer according to anyone of the above-mentioned items [1] to [8], wherein the polycarbonate-polyorganosiloxane copolymer satisfies the following expression (F6):

$$nM3 < nM2 \quad (F6)$$

wherein nM2 is as described above, and nM3 represents an average chain length of the polyorganosiloxane blocks (A-2) in polycarbonate-polyorganosiloxane copolymers each having a molecular weight determined by using the polycarbonate as a conversion reference of from 4,500 or more to less than 16,000 among the polycarbonate-polyorganosiloxane copolymers obtained through the separation of the polycarbonate-polyorganosiloxane copolymer by the gel permeation chromatography.

[10] The polycarbonate-polyorganosiloxane copolymer according to anyone of the above-mentioned items [1] to [9], wherein the polycarbonate-polyorganosiloxane copolymers each having a molecular weight determined by using the polycarbonate as a conversion reference of from 56,000 or more to 200,000 or less among the polycarbonate-polyorganosiloxane copolymers obtained through the separation of the polycarbonate-polyorganosiloxane copolymer by the gel permeation chromatography satisfy the following expression (F7a):

$$1.5 \leq iPOS/iPC \quad (F7a)$$

wherein iPOS represents an average content (mol) of linking groups of the polycarbonate blocks (A-1) and the polyorganosiloxane blocks (A-2), and iPC represents an average content (mol) of terminal groups of the polycarbonate blocks (A-1).

[11] The polycarbonate-polyorganosiloxane copolymer according to any one of the above-mentioned items [1] to [10], wherein the polycarbonate-polyorganosiloxane copolymer satisfies the following expression (F7b):

$$100 < iM1/iA \times 100 \quad (F7b)$$

wherein iM1 represents a ratio (iPOS/iPC) of iPOS to iPC in the polycarbonate-polyorganosiloxane copolymers each having a molecular weight determined by using the polycarbonate as a conversion reference of from 56,000 or more to 200,000 or less among the polycarbonate-polyorganosiloxane copolymers obtained through the separation of the polycarbonate-polyorganosiloxane copolymer by the gel permeation chromatography, and iA represents a ratio (iPOS/iPC) of iPOS to iPC in the polycarbonate-polyorganosiloxane copolymer.

[12] The polycarbonate-polyorganosiloxane copolymer according to any one of the above-mentioned items [1] to [11], wherein the polycarbonate-polyorganosiloxane copolymer satisfies the following expression (F8):

$$iM2 < iM1 \quad (F8)$$

wherein iM1 is as described above, and iM2 represents a ratio (iPOS/iPC) of iPOS to iPC in polycarbonate-polyorganosiloxane copolymers each having a molecular weight determined by using the polycarbonate as a conversion reference of from 16,000 or more to less than 56,000 among the polycarbonate-polyorganosiloxane copolymers obtained through the separation of the polycarbonate-polyorganosiloxane copolymer by the gel permeation chromatography.

[13] The polycarbonate-polyorganosiloxane copolymer according to any one of the above-mentioned items [1] to [12], wherein the polycarbonate-polyorganosiloxane copolymer satisfies the following expression (F9):

$$iM3<iM2 \tag{F9}$$

wherein iM2 is as described above, and iM3 represents a ratio (iPOS/iPC) of iPOS to iPC in polycarbonate-polyorganosiloxane copolymers each having a molecular weight determined by using the polycarbonate as a conversion reference of from 4,500 or more to less than 16,000 among the polycarbonate-polyorganosiloxane copolymers obtained through the separation of the polycarbonate-polyorganosiloxane copolymer by the gel permeation chromatography.

[14] The polycarbonate-polyorganosiloxane copolymer according to any one of the above-mentioned items [1] to [13], wherein the aromatic polycarbonate-based resin (B) contains a polycarbonate block including, in a main chain thereof, a repeating unit represented by the following general formula (III):

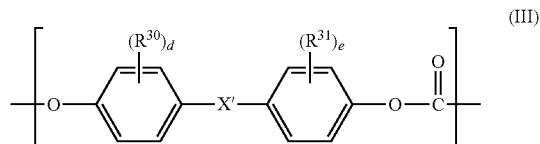

wherein $R^{30}$ and $R^{31}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "d" and "e" each independently represent an integer of from 0 to 4.

[15] The polycarbonate-polyorganosiloxane copolymer according to any one of the above-mentioned items [1] to [14], wherein the polyorganosiloxane blocks (A-2) have an average chain length of from 30 or more to 500 or less.

[16] The polycarbonate-polyorganosiloxane copolymer according to any one of the above-mentioned items [1] to [15], wherein the polyorganosiloxane blocks (A-2) have an average chain length of from 55 or more to 500 or less.

[17] The polycarbonate-polyorganosiloxane copolymer according to any one of the above-mentioned items [1] to [16], wherein the polyorganosiloxane blocks (A-2) have an average chain length of from 55 or more to 85 or less.

[18] The polycarbonate-polyorganosiloxane copolymer according to any one of the above-mentioned items [1] to [17], wherein a content of the polyorganosiloxane blocks (A-2) in the polycarbonate-polyorganosiloxane copolymer (A) is from 5 mass % or more to 70 mass % or less.

[19] The polycarbonate-polyorganosiloxane copolymer according to any one of the above-mentioned items [1] to [18], wherein the polycarbonate-polyorganosiloxane copolymer (A) has a viscosity-average molecular weight (Mv) of from 9,000 or more to 50,000 or less.

[20] A flame-retardant polycarbonate-based resin composition, comprising: the polycarbonate-polyorganosiloxane copolymer (A) of any one of the above-mentioned items [1] to [19]; an aromatic polycarbonate-based resin (B) except the polycarbonate-polyorganosiloxane copolymer (A); and a flame retardant (C), wherein the flame retardant (C) is blended in an amount of from 0.001 part by mass or more to 20 parts by mass or less with respect to 100 parts by mass of the polycarbonate-polyorganosiloxane copolymer (A) and the aromatic polycarbonate-based resin (B).

[21] The flame-retardant polycarbonate-based resin composition according to the above-mentioned item [20], wherein a mass ratio "(A)/(B)" of the polycarbonate-polyorganosiloxane copolymer (A) to the aromatic polycarbonate-based resin (B) is from 0.1/99.9 to 99.9/0.1.

[22] The flame-retardant polycarbonate-based resin composition according to the above-mentioned item [20] or [21], wherein a content of the polyorganosiloxane blocks (A-2) with respect to a total of the polycarbonate-polyorganosiloxane copolymer (A) and the aromatic polycarbonate-based resin (B) is from 0.1 mass % or more to 10 mass % or less.

[23] The flame-retardant polycarbonate-based resin composition according to any one of the above-mentioned items [20] to [22], wherein a polycarbonate-based resin formed of the polycarbonate-polyorganosiloxane copolymer (A) and the aromatic polycarbonate-based resin (B) has a viscosity-average molecular weight (Mv) of from 9,000 or more to 50,000 or less.

[24] The flame-retardant polycarbonate-based resin composition according to any one of the above-mentioned items [20] to [23], wherein the flame retardant (C) comprises at least one selected from an organic alkali metal salt and an organic alkali earth metal salt.

[25] The flame-retardant polycarbonate-based resin composition according to the above-mentioned item [24], wherein the flame retardant (C) comprises potassium perfluorobutanesulfonate.

[26] The flame-retardant polycarbonate-based resin composition according to the above-mentioned item [24] or [25], wherein a content of the flame retardant (C) is from 0.001 part by mass or more to 1 part by mass or less with respect to 100 parts by mass of a resin formed of the polycarbonate-polyorganosiloxane copolymer (A) and the aromatic polycarbonate-based resin (B) except the polycarbonate-polyorganosiloxane copolymer (A).

[27] The flame-retardant polycarbonate-based resin composition according to any one of the above-mentioned items [20] to [26], wherein the flame retardant (C) comprises a phosphorus-based flame retardant.

[28] The flame-retardant polycarbonate-based resin composition according to the above-mentioned item [27], wherein a content of the flame retardant (C) is from 0.1 part by mass or more to 20 parts by mass or less with respect to 100 parts by mass of a resin formed of the polycarbonate-polyorganosiloxane copolymer (A) and the aromatic polycarbonate-based resin (B) except the polycarbonate-polyorganosiloxane copolymer (A).

[29] The flame-retardant polycarbonate-based resin composition according to any one of the above-mentioned items [20] to [28], further comprising 0.01 part by mass or more to 1 part by mass or less of a flame retardant auxiliary (D) with respect to 100 parts by mass of a resin formed of the polycarbonate-polyorganosiloxane copolymer (A) and the aromatic polycarbonate-based resin (B).

[30] The flame-retardant polycarbonate-based resin composition according to the above-mentioned item [29], wherein the flame retardant auxiliary (D) comprises a polytetrafluoroethylene.

[31] The flame-retardant polycarbonate-based resin composition according to the above-mentioned item [29] or [30], wherein a content of the flame retardant auxiliary (D) is from 0.01 part by mass or more to 1 part by mass or less.

[32] A molded article, which is obtained by molding the flame-retardant polycarbonate-based resin composition of any one of the above-mentioned items [20] to [31].

[33] The molded article according to the above-mentioned item [32], wherein the molded article comprises a casing for electrical and electronic equipment.

[34] The molded article according to the above-mentioned item [32], wherein the molded article comprises apart for an automobile and a building material.

Advantageous Effects of Invention

According to the present invention, the polycarbonate-polyorganosiloxane copolymer having more excellent impact resistance, the flame-retardant polycarbonate-based resin composition including the copolymer, and the molded article of the composition can be obtained.

DESCRIPTION OF EMBODIMENTS

Figure 1:
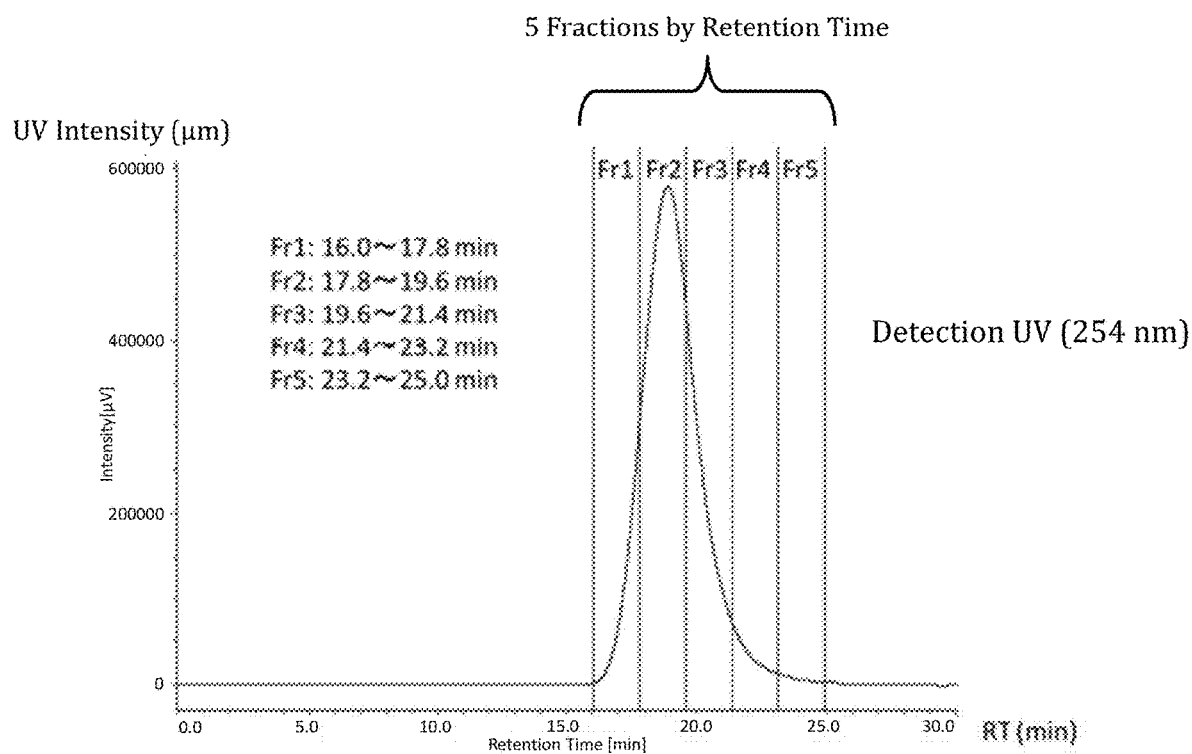
FIG. 1 is a graph in which a polycarbonate-polyorganosiloxane copolymer is fractionated into 5 fractions for respective retention times by gel permeation chromatography.
Figure 2:
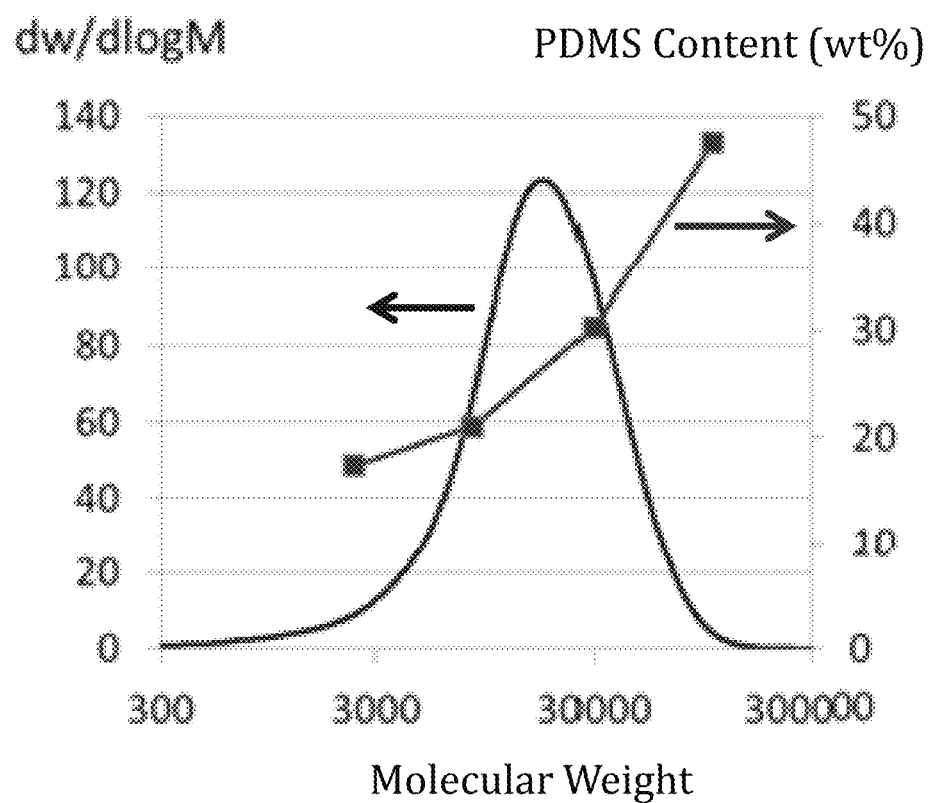
FIG. 2 is a graph showing a polyorganosiloxane block content for each molecular weight determined by the gel permeation chromatography through the use of a polycarbonate as a conversion reference in Production Example 1.
Figure 3:
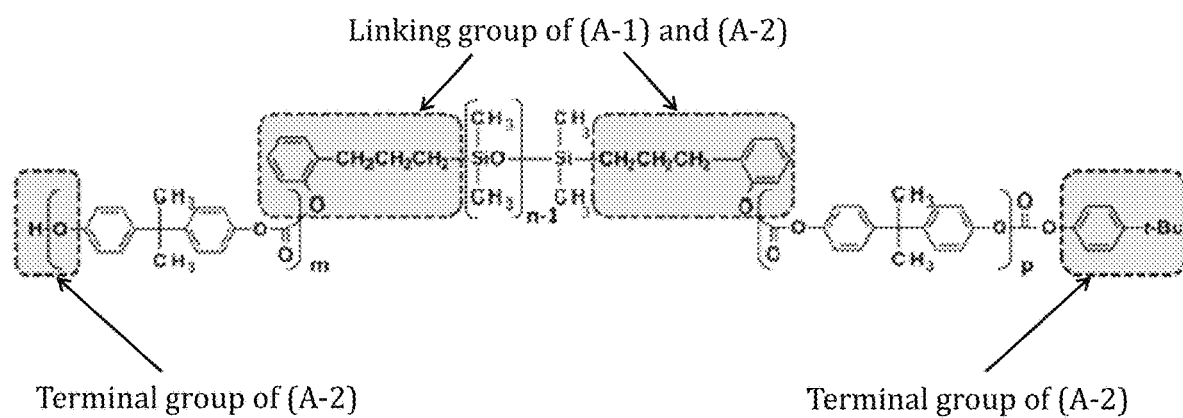
FIG. 3 is a view illustrating an example of a linking group of a polyorganosiloxane block and a polycarbonate block, and an example of a terminal group of the polycarbonate block.

The inventors of the present invention have made extensive investigations, and as a result, have found that, when a polycarbonate-polyorganosiloxane copolymer whose polyorganosiloxane block concentration in a specific molecular weight region is equal to or more than a certain value is used, a polycarbonate-polyorganosiloxane copolymer having more excellent impact resistance is obtained without the extension of the chain length of a polyorganosiloxane block or an increase in content thereof. In addition, the inventors have found that the addition of a flame retardant to a polycarbonate-based resin including the polycarbonate-polyorganosiloxane copolymer provides a flame-retardant polycarbonate-based resin composition that is excellent in flame retardancy and has more excellent impact resistance, and a molded article of the composition. Detailed description is given below.

The term "XX to YY" as used herein means "from XX or more to YY or less." In this description, a specification considered to be preferred may be arbitrarily adopted, and a combination of preferred specifications is more preferred.

<Polycarbonate-Polyorganosiloxane Copolymer>

A polycarbonate-polyorganosiloxane copolymer according to a first embodiment of the present invention comprises: polycarbonate blocks (A-1) each formed of a repeating unit represented by the following general formula (I); and polyorganosiloxane blocks (A-2) each containing a repeating unit represented by the following general formula (II), wherein the polycarbonate-polyorganosiloxane copolymer satisfies the following expression (F1a):

$$15 \leq wM1 \quad (F1a)$$

wherein wM1 represents an average content (mass %) of the polyorganosiloxane blocks (A-2) in polycarbonate-polyorganosiloxane copolymers each having a molecular weight determined by using a polycarbonate as a conversion reference of from 56,000 or more to 200,000 or less among polycarbonate-polyorganosiloxane copolymers obtained through separation of the polycarbonate-polyorganosiloxane copolymer by gel permeation chromatography;

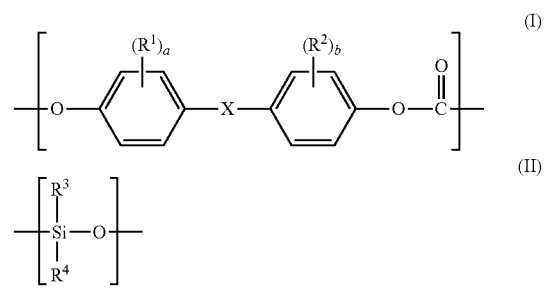

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

In the general formula (I), examples of the halogen atom that $R^1$ and $R^2$ each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups (the term "various" means that a linear group and all kinds of branched groups are included, and in this description, the same holds true for the following), various pentyl groups, and various hexyl groups. Examples of the alkoxy group that $R^1$ and $R^2$ each independently represent include alkoxy groups having the above-mentioned alkyl groups as alkyl group moieties.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the cycloalkylidene group represented by X include a cyclohexylidene group, a 3,5,5-trimethylcyclohexylidene group, and a 2-adamantylidene group. Among them, a cycloalkylidene group having 5 to 10 carbon atoms is preferred, and a cycloalkylidene group having 5 to 8 carbon atoms is more preferred. Examples of the aryl moiety of the arylalkylene group represented by X include aryl groups each having 6 to 14 ring-forming carbon atoms, such as a phenyl group, a naphthyl group, a biphenyl group, and an anthryl group, and examples of the alkylene group include the above-mentioned alkylene groups. Examples of the aryl moiety of the arylalkylidene group represented by X include aryl groups each having 6 to 14 ring-forming carbon atoms, such as a phenyl group, a naphthyl group, a biphenyl group, and an anthryl group, and examples of the alkylidene group may include the above-mentioned alkylidene groups.

"a" and "b" each independently represent an integer of from 0 to 4, preferably from 0 to 2, more preferably 0 or 1.

Among them, a repeating unit in which "a" and "b" each represent 0, and X represents a single bond or an alkylene group having 1 to 8 carbon atoms, or a repeating unit in which "a" and "b" each represent 0, and X represents an alkylene group having 3 carbon atoms, in particular an isopropylidene group is suitable.

In the general formula (II), examples of the halogen atom represented by $R^3$ or $R^4$ include a fluorine atom, a chlorine atom, a bromine atom, and an iodine atom. Examples of the alkyl group represented by $R^3$ or $R^4$ include a methyl group, an ethyl group, a n-propyl group, an isopropyl group, various butyl groups, various pentyl groups, and various hexyl groups. Examples of the alkoxy group represented by $R^3$ or $R^4$ include alkoxy groups having the above-mentioned alkyl groups as alkyl group moieties. Examples of the aryl group represented by $R^3$ or $R^4$ include a phenyl group and a naphthyl group.

$R^3$ and $R^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

More specifically, the polyorganosiloxane block (A-2) containing the repeating unit represented by the general formula (II) preferably has a unit represented by any one of the following general formulae (II-I) to (II-III):

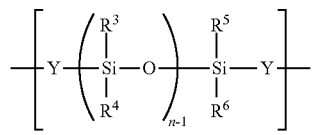

(II-I)

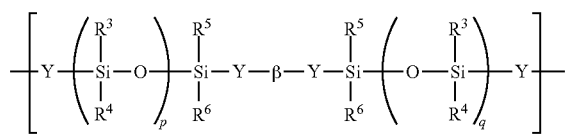

(II-II)

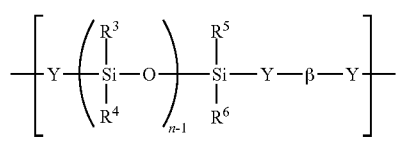

(II-III)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$, or $R^6$ may be identical to or different from each other, Y represents —$R^7O$—, —$R^7COO$—, —$R^7NH$—, —$R^7NR^8$—, —COO—, —S—, —$R^7COO$—$R^9$—O—, or —$R^7O$—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, R represents a divalent group derived from a diisocyanate compound, or a divalent group derived from a dicarboxylic acid or a halide of a dicarboxylic acid, "n" represents the chain length of the polyorganosiloxane, and n–1, and "p" and "q" each represent the number of repetitions of a polyorganosiloxane unit and each represent an integer of 1 or more, and the sum of "p" and "q" is n–2.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups, various pentyl groups, and various hexyl groups. Examples of the alkoxy group that $R^3$ to $R^6$ each independently represent include alkoxy groups having the above-mentioned alkyl groups as alkyl group moieties. Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms.

$R^3$ to $R^6$ in the general formula (II-I), the general formula (II-II), and/or the general formula (II-III) each preferably represent a methyl group.

The linear or branched alkylene group represented by $R^7$ in —$R^7O$—, —$R^7COO$—, —$R^7NH$—, —$R^7NR^8$—, —$R^7COO$—$R^9$—O—, or —$R^7O$—$R^{10}$—O— represented by Y is, for example, an alkylene group having 1 to 8 carbon atoms, preferably 1 to 5 carbon atoms, and the cyclic alkylene group represented by $R^7$ is, for example, a cycloalkylene group having 5 to 15 carbon atoms, preferably 5 to 10 carbon atoms.

The aryl-substituted alkylene group represented by $R^7$ may have a substituent, such as an alkoxy group or an alkyl group, on its aromatic ring, and a specific structure thereof may be, for example, a structure represented by the following general formula (i) or (ii). When the block has the aryl-substituted alkylene group, the alkylene group is bonded to Si.

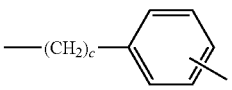

(i)

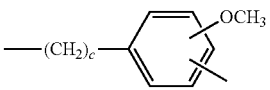

(ii)

wherein "c" represents a positive integer and typically represents an integer of from 1 to 6.

The diarylene group represented by any one of $R^7$, $R^9$, and $R^{10}$ refers to a group in which two arylene groups are linked to each other directly or through a divalent organic group, and is specifically a group having a structure represented by —$Ar^1$—W—$Ar^2$—. Here, $Ar^1$ and $Ar^2$ each represent an arylene group, and W represents a single bond or a divalent organic group. Examples of the divalent organic group represented by W include an isopropylidene group, a methylene group, a dimethylene group, and a trimethylene group.

Examples of the arylene group represented by any one of $R^7$, $Ar^1$, and $Ar^2$ include arylene groups each having 6 to 14 ring-forming carbon atoms, such as a phenylene group, a naphthylene group, a biphenylene group, and an anthrylene group. Those arylene groups may each have an arbitrary substituent, such as an alkoxy group or an alkyl group.

The alkyl group represented by $R^8$ is a linear or branched group having 1 to 8, preferably 1 to 5 carbon atoms. The alkenyl group represented by $R^8$ is, for example, a linear or branched group having 2 to 8, preferably 2 to 5 carbon atoms. The aryl group represented by $R^8$ is, for example, a phenyl group or a naphthyl group. The aralkyl group represented by $R^8$ is, for example, a phenylmethyl group or a phenylethyl group.

The linear, branched, or cyclic alkylene group represented by $R^{10}$ is the same as that represented by $R^7$.

Y preferably represents —$R^7O$—. $R^7$ preferably represents an aryl-substituted alkylene group, in particular a residue of a phenol-based compound having an alkyl group, and more preferably represents an organic residue derived from allylphenol or an organic residue derived from eugenol.

With regard to "p" and "q" in the formula (II-II), it is preferred that p=q.

In addition, R represents a divalent group derived from a diisocyanate compound, or a divalent group derived from a dicarboxylic acid or a halide of a dicarboxylic acid, and examples thereof include divalent groups represented by the following general formulae (iii) to (vii).

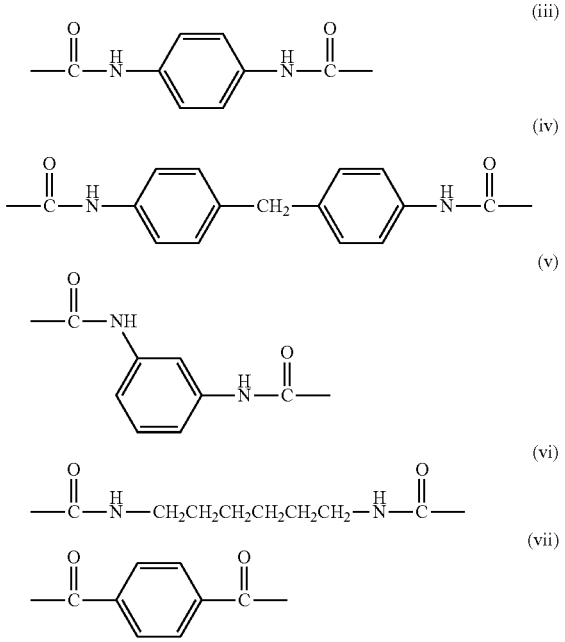

The average chain length "n" of the polyorganosiloxane blocks (A-2) in the PC-POS copolymer (A) is preferably 30 or more, more preferably 35 or more, still more preferably 40 or more, still further more preferably 50 or more, particularly preferably 55 or more, most preferably 60 or more. In addition, the average chain length is preferably 500 or less, more preferably 400 or less, still more preferably 300 or less, still further more preferably 200 or less, particularly preferably 120 or less, most preferably 85 or less. The average chain length is calculated by nuclear magnetic resonance (NMR) measurement. When the average chain length "n" falls within the range of from 30 or more to 500 or less, more excellent impact resistance can be obtained. In addition, the average chain length "n" of the polyorganosiloxane blocks (A-2) preferably falls within the range of from 55 or more to 500 or less from the viewpoint that more excellent impact resistance is obtained.

The content of the polyorganosiloxane blocks (A-2) in the PC-POS copolymer (A) is preferably 5 mass % or more, more preferably 6 mass % or more, still more preferably 10 mass % or more, still further more preferably 14 mass % or more, still further more preferably 18 mass % or more, particularly preferably 21 mass % or more, and is preferably 70 mass % or less, more preferably 50 mass % or less, still more preferably 45 mass % or less, particularly preferably 40 mass % or less. When the content of the polyorganosiloxane blocks in the PC-POS copolymer (A) falls within the range, more excellent impact resistance can be obtained.

The viscosity-average molecular weight (Mv) of the PC-POS copolymer (A) may be appropriately adjusted by using, for example, a molecular weight modifier (terminal stopper) so as to be a target molecular weight in accordance with applications or products in which the copolymer is used. However, the viscosity-average molecular weight is preferably 9,000 or more, more preferably 12,000 or more, still more preferably 14,000 or more, particularly preferably 16,000 or more, and is preferably 50,000 or less, more preferably 30,000 or less, still more preferably 23,000 or less, particularly preferably 22,000 or less, most preferably 20,000 or less. When the viscosity-average molecular weight is 9,000 or more, a sufficient strength of a molded article can be obtained. When the viscosity-average molecular weight is 50,000 or less, injection molding or extrusion molding can be performed at the temperature at which the heat deterioration of the copolymer does not occur.

The viscosity-average molecular weight (Mv) is a value calculated from the following Schnell's equation by measuring the limiting viscosity [η] of a methylene chloride solution at 20° C.

$$[\eta]=1.23\times10^{-5}\times Mv^{0.83}$$

The polycarbonate-polyorganosiloxane copolymer (A) may be produced by a known production method, such as an interfacial polymerization method (phosgene method), a pyridine method, or an ester exchange method. Particularly in the case of the interfacial polymerization method, a step of separating an organic phase containing the PC-POS copolymer (A) and an aqueous phase containing an unreacted product, a catalyst residue, or the like becomes easier, and hence the separation of the organic phase containing the PC-POS copolymer (A) and the aqueous phase in each washing step based on alkali washing, acid washing, or pure water washing becomes easier. Accordingly, the PC-POS copolymer (A) is efficiently obtained. With regard to a method of producing the PC-POS copolymer (A), reference may be made to, for example, a method described in JP 2010-241943 A.

Specifically, the PC-POS copolymer (A) may be produced by: dissolving a polycarbonate oligomer produced in advance to be described later and a polyorganosiloxane in a water-insoluble organic solvent (e.g., methylene chloride); adding a solution of a dihydric phenol-based compound (e.g., bisphenol A) in an aqueous alkali compound (e.g., aqueous sodium hydroxide) to the solution; and subjecting the mixture to an interfacial polycondensation reaction through the use of a tertiary amine (e.g., triethylamine) or a quaternary ammonium salt (e.g., trimethylbenzylammonium chloride) as a polymerization catalyst in the presence of a terminal stopper (a monohydric phenol, such as p-tert-butylphenol). In addition, the PC-POS copolymer (A) may also be produced by copolymerizing the polyorganosiloxane and a dihydric phenol, and phosgene, a carbonate ester, or a chloroformate.

When the polycarbonate-polyorganosiloxane copolymer (A) in the polycarbonate-based resin composition of the present application is produced by, for example, causing the polycarbonate oligomer and a polyorganosiloxane raw material to react with each other in an organic solvent, and then causing the resultant to react with the dihydric phenol, the solid content weight (g/L) of the polycarbonate oligomer in 1 L of a mixed solution of the organic solvent and the polycarbonate oligomer preferably falls within the range of from 80 g/L or more to 200 g/L or less. The solid content weight is more preferably 90 g/L or more, still more preferably 100 g/L or more, and is more preferably 180 g/L or less, still more preferably 170 g/L or less.

A polyorganosiloxane represented by the following general formula (1), general formula (2), and/or general formula (3) may be used as the polyorganosiloxane serving as a raw material:

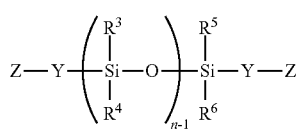
(1)

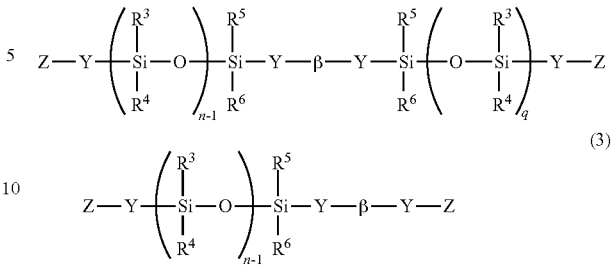

wherein $R^3$ to $R^6$, Y, β, n–1, "p", and "q" are as described above, and specific examples and preferred examples thereof are also the same as those described above, and Z represents a hydrogen atom or a halogen atom, and a plurality of Z may be identical to or different from each other.

Examples of the polyorganosiloxane represented by the general formula (1) include compounds each represented by any one of the following general formulae (1-1) to (1-11):

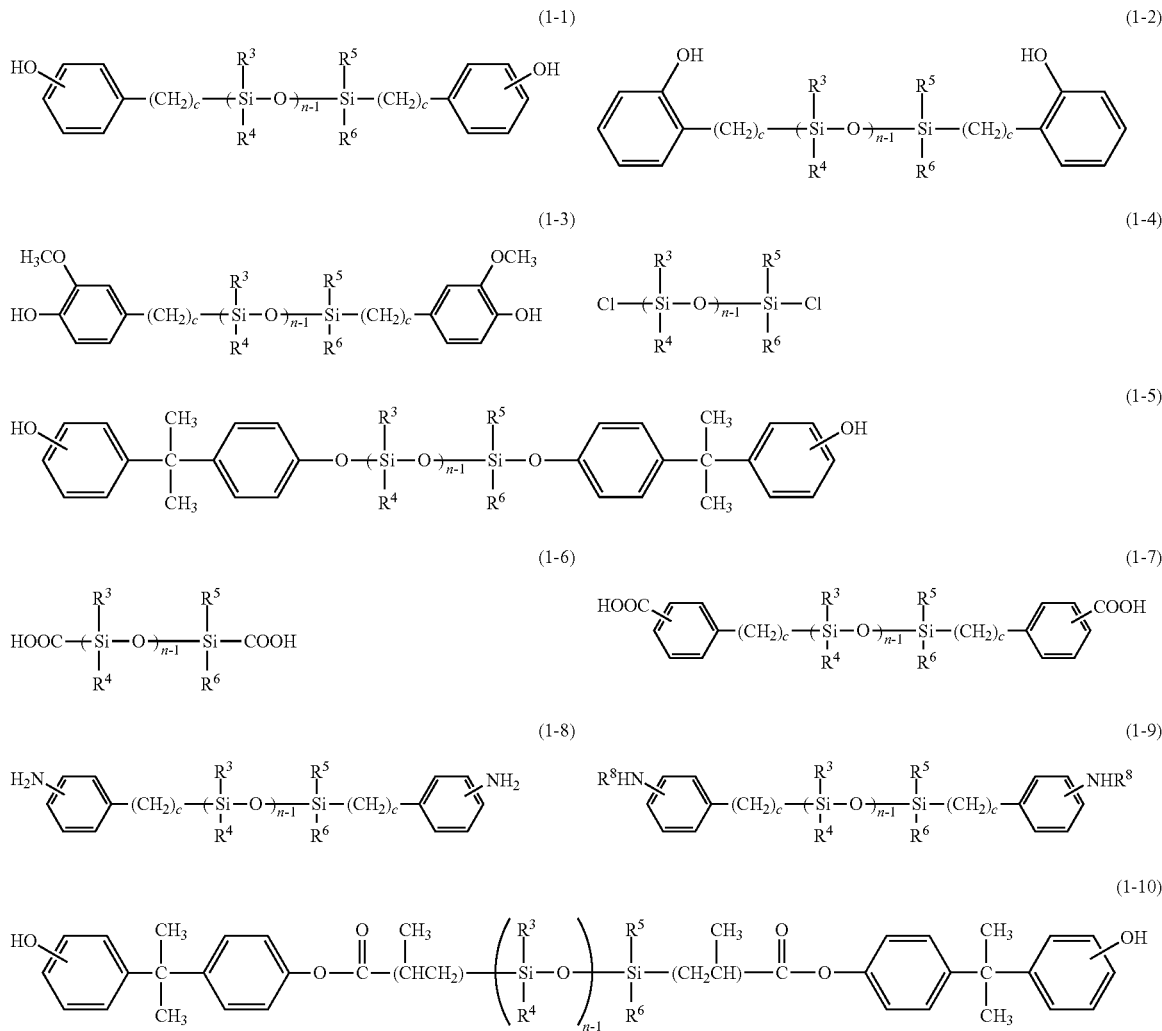

-continued

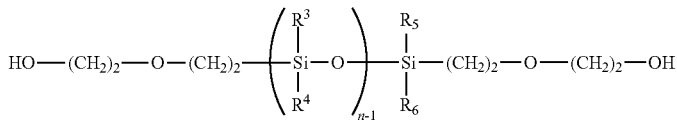

(1-11)

wherein in the general formulae (1-1) to (1-11), $R^3$ to $R^6$, "n", and $R^8$ are as defined above, and preferred examples thereof are also the same as those described above, and "c" represents a positive integer and typically represents an integer of from 1 to 6.

Among them, a phenol-modified polyorganosiloxane represented by the general formula (1-1) is preferred from the viewpoint of its ease of polymerization. In addition, an α,ω-bis[3-(o-hydroxyphenyl)propyl]polydimethylsiloxane, which is one compound represented by the general formula (1-2), or an α,ω-bis[3-(4-hydroxy-3-methoxyphenyl)propyl]polydimethylsiloxane, which is one compound represented by the general formula (1-3), is preferred from the viewpoint of its ease of availability.

In addition to the foregoing, a compound having a structure represented by the following general formula (4) may be used as a polyorganosiloxane raw material:

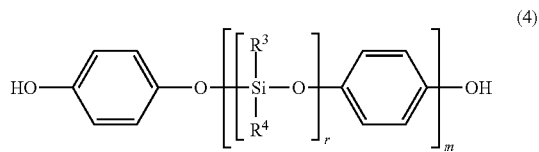

(4)

wherein $R^3$ and $R^4$ are identical to those described above. The average chain length of the polyorganosiloxane block represented by the general formula (4) is (r×m), and the range of the (r×m) is the same as that of the "n".

When the compound represented by the general formula (4) is used as a polyorganosiloxane raw material, the polyorganosiloxane block (A-2) preferably has a unit represented by the following general formula (II-IV):

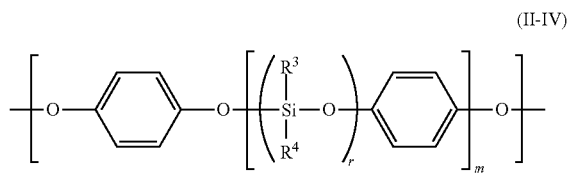

(II-IV)

wherein $R^3$, $R^4$, "r", and "m" are as described above.

The copolymer may include a structure represented by the following general formula (II-V) as the polyorganosiloxane block (A-2):

wherein $R^{18}$ to $R^{21}$ each independently represent a hydrogen atom or an alkyl group having 1 to 13 carbon atoms, $R^{22}$ represents an alkyl group having 1 to 6 carbon atoms, a hydrogen atom, a halogen atom, a hydroxy group, an alkoxy group having 1 to 6 carbon atoms, or an aryl group having 6 to 14 carbon atoms, $Q^2$ represents a divalent aliphatic group having 1 to 10 carbon atoms, and "n" represents an average chain length and represents from 30 to 70.

In the general formula (II-V), examples of the alkyl group having 1 to 13 carbon atoms that $R^{18}$ to $R^{21}$ each independently represent include a methyl group, an ethyl group, a n-propyl group, an isopropyl group, various butyl groups, various pentyl groups, various hexyl groups, various heptyl groups, various octyl groups, a 2-ethylhexyl group, various nonyl groups, various decyl groups, various undecyl groups, various dodecyl groups, and various tridecyl groups. Among them, $R^{18}$ to $R^{21}$ each preferably represent a hydrogen atom or an alkyl group having 1 to 6 carbon atoms, and it is more preferred that all of $R^{18}$ to $R^{21}$ each represent a methyl group.

Examples of the alkyl group having 1 to 6 carbon atoms represented by $R^{22}$ include a methyl group, an ethyl group, a n-propyl group, an isopropyl group, various butyl groups, various pentyl groups, and various hexyl groups. Examples of the halogen atom represented by $R^{22}$ include a fluorine atom, a chlorine atom, a bromine atom, and an iodine atom. An example of the alkoxy group having 1 to 6 carbon atoms represented by $R^{22}$ is an alkoxy group whose alkyl group moiety is the alkyl group described above. In addition, examples of the aryl group having 6 to 14 carbon atoms represented by $R^{22}$ include a phenyl group, a toluyl group, a dimethylphenyl group, and a naphthyl group.

Among them, $R^{22}$ preferably represents a hydrogen atom or an alkoxy group having 1 to 6 carbon atoms, more preferably represents a hydrogen atom or an alkoxy group having 1 to 3 carbon atoms, and still more preferably represents a hydrogen atom.

The divalent aliphatic group having 1 to 10 carbon atoms represented by $Q^2$ is preferably a linear or branched divalent saturated aliphatic group having 1 to 10 carbon atoms. The number of carbon atoms of the saturated aliphatic group is preferably from 1 to 8, more preferably from 2 to 6, still more preferably from 3 to 6, still further more preferably from 4 to 6. In addition, the average chain length "n" is as described above.

A preferred mode of the constituent unit (II-V) may be, for example, a structure represented by the following general formula (II-VI):

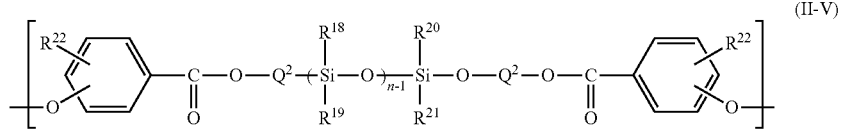

(II-V)

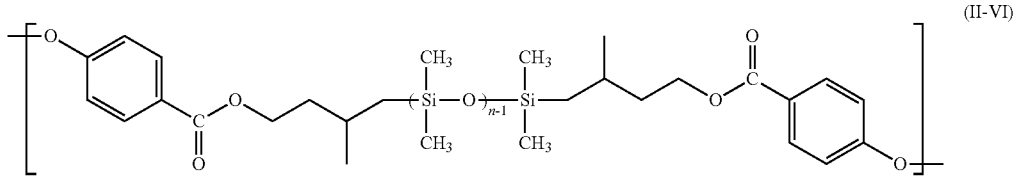

(II-VI)

wherein "n" is identical to that described above.

The polyorganosiloxane block (A-2) represented by the general formula (II-V) or (II-VI) may be obtained by using a polyorganosiloxane raw material represented by the following general formula (5) or (6):

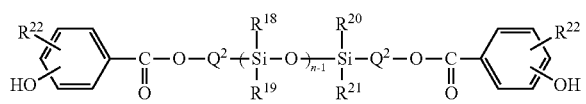

(5)

wherein $R^{18}$ to $R^{22}$, $Q^2$, and "n" are as described above;

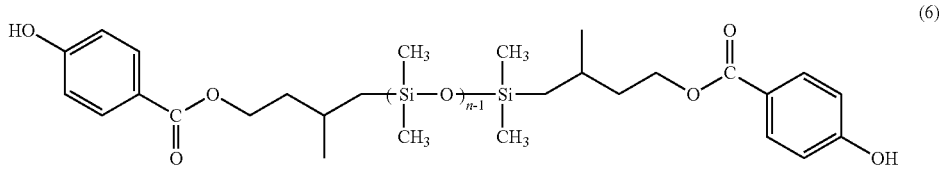

(6)

wherein "n" is as described above.

A method of producing the polyorganosiloxane is not particularly limited. According to, for example, a method described in JP 11-217390 A, a crude polyorganosiloxane may be obtained by: causing cyclotrisiloxane and disiloxane to react with each other in the presence of an acid catalyst to synthesize α,ω-dihydrogen organopentasiloxane; and then subjecting the α,ω-dihydrogen organopentasiloxane to an addition reaction with, for example, a phenolic compound (e.g., 2-allylphenol, 4-allylphenol, eugenol, or 2-propenylphenol) in the presence of a catalyst for a hydrosilylation reaction. In addition, according to a method described in JP 2662310 B2, the crude polyorganosiloxane may be obtained by: causing octamethylcyclotetrasiloxane and tetramethyldisiloxane to react with each other in the presence of sulfuric acid (acid catalyst); and subjecting the resultant α,ω-dihydrogen organopolysiloxane to an addition reaction with the phenolic compound or the like in the presence of the catalyst for a hydrosilylation reaction in the same manner as that described above. The α,ω-dihydrogen organopolysiloxane may be used after its chain length "n" has been appropriately adjusted in accordance with its polymerization conditions, or a commercial α,ω-dihydrogen organopolysiloxane may be used.

Examples of the catalyst for a hydrosilylation reaction include transition metal-based catalysts. Among them, a platinum-based catalyst is preferably used in terms of a reaction rate and selectivity. Specific examples of the platinum-based catalyst include chloroplatinic acid, an alcohol solution of chloroplatinic acid, an olefin complex of platinum, a complex of platinum and a vinyl group-containing siloxane, platinum-supported silica, and platinum-supported activated carbon.

The crude polyorganosiloxane is preferably brought into contact with an adsorbent to cause the adsorbent to adsorb and remove a transition metal derived from a transition metal-based catalyst in the crude polyorganosiloxane, the catalyst having been used as the catalyst for a hydrosilylation reaction.

An adsorbent having an average pore diameter of, for example, 1,000 Å or less may be used as the adsorbent. When the average pore diameter is 1,000 Å or less, the transition metal in the crude polyorganosiloxane can be efficiently removed. From such viewpoint, the average pore diameter of the adsorbent is preferably 500 Å or less, more preferably 200 Å or less, still more preferably 150 Å or less, still further more preferably 100 Å or less. In addition, from the same viewpoint, the adsorbent is preferably a porous adsorbent.

Although the adsorbent is not particularly limited as long as the adsorbent has the above-mentioned average pore diameter, for example, activated clay, acid clay, activated carbon, synthetic zeolite, natural zeolite, activated alumina, silica, a silica-magnesia-based adsorbent, diatomaceous earth, or cellulose may be used, and at least one selected from the group consisting of activated clay, acid clay, activated carbon, synthetic zeolite, natural zeolite, activated alumina, silica, and a silica-magnesia-based adsorbent is preferred.

After the adsorbent has been caused to adsorb the transition metal in the crude polyorganosiloxane, the adsorbent may be separated from the polyorganosiloxane by arbitrary separating means. Examples of the means for separating the adsorbent from the polyorganosiloxane include a filter and centrifugal separation. When the filter is used, a filter such as a membrane filter, a sintered metal filter, or a glass fiber filter may be used. Among them, a membrane filter is particularly preferably used.

The average particle diameter of the adsorbent is typically from 1 μm or more to 4 mm or less, preferably from 1 μm or more to 100 μm or less from the viewpoint that the adsorbent is separated from the polyorganosiloxane after the adsorption of the transition metal.

When the adsorbent is used, its usage amount is not particularly limited. The porous adsorbent may be used in an amount in the range of from preferably 1 part by mass or more, more preferably 2 parts by mass or more to preferably 30 parts by mass or less, more preferably 20 parts by mass or less with respect to 100 parts by mass of the crude polyorganosiloxane.

When the crude polyorganosiloxane to be treated has so high a molecular weight that the polyorganosiloxane is not in a liquid state, the polyorganosiloxane may be heated to such a temperature as to be in a liquid state at the time of the performance of the adsorption with the adsorbent and the separation of the adsorbent. Alternatively, the adsorption and the separation may be performed after the polyorganosiloxane has been dissolved in a solvent, such as methylene chloride or hexane.

A polyorganosiloxane having a desired molecular weight distribution is obtained by regulating its molecular weight distribution through, for example, the blending of a plurality of polyorganosiloxanes. With regard to the blending, a crude polyorganosiloxane having a desired molecular weight distribution may be obtained by blending a plurality of α,ω-dihydrogen organopolysiloxanes and then subjecting a phenolic compound or the like to an addition reaction with the resultant in the presence of a catalyst for a hydrosilylation reaction. In addition, purification, such as the removal of the catalyst for a hydrosilylation reaction, may be performed after a plurality of crude polyorganosiloxanes have been blended. A plurality of polyorganosiloxanes after the purification may be blended. In addition, a molecular weight distribution may be appropriately adjusted depending on a polymerization condition at the time of the production of a polyorganosiloxane. In addition, a desired molecular weight distribution may be obtained by fractionating only part of existing polyorganosiloxanes through means such as various kinds of separation.

The polycarbonate oligomer may be produced by a reaction between a dihydric phenol and a carbonate precursor, such as phosgene or triphosgene, in an organic solvent, such as methylene chloride, chlorobenzene, or chloroform. When the polycarbonate oligomer is produced by using an ester exchange method, the oligomer may be produced by a reaction between the dihydric phenol and a carbonate precursor, such as diphenyl carbonate.

A dihydric phenol represented by the following general formula (viii) is preferably used as the dihydric phenol:

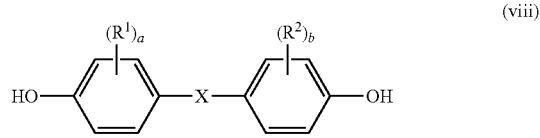

(viii)

wherein $R^1$, $R^2$, "a", "b", and X are as described above.

Examples of the dihydric phenol represented by the general formula (viii) include: bis(hydroxyphenyl)alkane-based dihydric phenols, such as 2,2-bis(4-hydroxyphenyl)propane [bisphenol A], bis(4-hydroxyphenyl)methane, 1,1-bis(4-hydroxyphenyl) ethane, and 2,2-bis(4-hydroxy-3,5-dimethylphenyl)propane; 4,4'-dihydroxydiphenyl; bis(4-hydroxyphenyl)cycloalkanes; bis(4-hydroxyphenyl) oxide; bis(4-hydroxyphenyl) sulfide; bis(4-hydroxyphenyl) sulfone; bis(4-hydroxyphenyl) sulfoxide; and bis(4-hydroxyphenyl) ketone. Those dihydric phenols may be used alone or as a mixture thereof.

Among them, bis(hydroxyphenyl)alkane-based dihydric phenols are preferred, and bisphenol A is more preferred. When bisphenol A is used as the dihydric phenol, the PC-POS copolymer is such that in the general formula (i), X represents an isopropylidene group and a=b=0.

Examples of the dihydric phenol except bisphenol A include bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiaryl fluorenes, and dihydroxydiaryladamantanes. Those dihydric phenols may be used alone or as a mixture thereof.

Examples of the bis(hydroxyaryl)alkanes include bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-tert-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane.

Examples of the bis(hydroxyaryl)cycloalkanes include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryl sulfides include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

An example of the dihydroxydiphenyls is 4,4'-dihydroxydiphenyl. Examples of the dihydroxydiarylfluorenes include 9,9-bis(4-hydroxyphenyl)fluorene and 9,9-bis(4-hydroxy-3-methylphenyl) fluorene. Examples of the dihydroxydiaryladamantanes include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of dihydric phenols except those described above include 4,4'-[1,3-phenylenebis(1-methylethylidene)]bisphenol, 10,10-bis(4-hydroxyphenyl)-9-anthrone, and 1,5-bis(4-hydroxyphenylthio)-2,3-dioxapentane.

In order to adjust the molecular weight of the PC-POS copolymer to be obtained, a terminal stopper (molecular weight modifier) may be used. Examples of the terminal stopper may include monohydric phenols, such as phenol, p-cresol, p-tert-butylphenol, p-tert-octylphenol, p-cumylphenol, p-nonylphenol, m-pentadecylphenol, and p-tert-amylphenol. Those monohydric phenols may be used alone or in combination thereof.

After the interfacial polycondensation reaction, the PC-POS copolymer (A) may be obtained by appropriately leaving the resultant at rest to separate the resultant into an aqueous phase and an organic solvent phase [separating step], washing the organic solvent phase (preferably washing the phase with a basic aqueous solution, an acidic aqueous solution, and water in the stated order) [washing step], concentrating the resultant organic phase [concentrating step], and drying the concentrated phase [drying step].

The polycarbonate-polyorganosiloxane copolymers obtained through the separation of the polycarbonate-polyorganosiloxane copolymer in the first embodiment of the present invention by gel permeation chromatography are required to satisfy the expression (F1a):

$$15 \leq wM1 \tag{F1a}$$

wherein wM1 represents the average content (mass %) of the polyorganosiloxane blocks (A-2) in polycarbonate-polyorganosiloxane copolymers each having a molecular weight determined by using a polycarbonate as a conversion reference of from 56,000 or more to 200,000 or less among polycarbonate-polyorganosiloxane copolymers obtained through separation of the polycarbonate-polyorganosiloxane copolymer by gel permeation chromatography.

Specifically, the average content of the polyorganosiloxane blocks (A-2) in the polycarbonate-polyorganosiloxane copolymers each having a molecular weight determined by using the polycarbonate as a conversion reference of from 56,000 or more to 200,000 or less among the polycarbonate-polyorganosiloxane copolymers obtained through the separation by the gel permeation chromatography is 15 mass % or more, preferably 20 mass % or more, more preferably 30 mass % or more, still more preferably 40 mass % or more from the viewpoint of the impact resistance of the copolymer.

In addition, the polycarbonate-polyorganosiloxane copolymers obtained through the separation of the above-mentioned polycarbonate-polyorganosiloxane copolymer by the gel permeation chromatography more desirably satisfy the following expression (F1a'):

$$13 \leq wM2 \tag{F1a'}$$

wherein wM2 represents the average content (mass %) of the polyorganosiloxane blocks (A-2) in polycarbonate-polyorganosiloxane copolymers each having a molecular weight determined by using the polycarbonate as a conversion reference of from 16,000 or more to less than 56,000 among the polycarbonate-polyorganosiloxane copolymers obtained through the separation of the polycarbonate-polyorganosiloxane copolymer by the gel permeation chromatography.

Specifically, the average content of the polyorganosiloxane blocks (A-2) in the polycarbonate-polyorganosiloxane copolymers each having a molecular weight determined by using the polycarbonate as a conversion reference of from 16,000 or more to less than 56,000 among the polycarbonate-polyorganosiloxane copolymers obtained through the separation by the gel permeation chromatography is preferably 13 mass % or more, more preferably 18 mass % or more, still more preferably 22 mass % or more, particularly preferably 27 mass % or more from the viewpoint of the impact resistance.

In addition, the average content (wA) of the polyorganosiloxane blocks (A-2) in the polycarbonate-polyorganosiloxane copolymer, and the average content (wM1) of the polyorganosiloxane blocks (A-2) in the polycarbonate-polyorganosiloxane copolymers each having a molecular weight determined by using the polycarbonate as a conversion reference of from 56,000 or more to 200,000 or less among the polycarbonate-polyorganosiloxane copolymers obtained through the separation of the polycarbonate-polyorganosiloxane copolymer by the gel permeation chromatography preferably satisfy the following expression (F1b):

$$100 < wM1/wA \times 100 \tag{F1b}$$

wherein wM1 is as described above, and wA represents the average content (mass %) of the polyorganosiloxane blocks (A-2) in the polycarbonate-polyorganosiloxane copolymer. The value of wM1/wA×100 is more preferably 115 or more, still more preferably 130 or more, still further more preferably 145 or more, particularly preferably 160 or more.

When the value of the wM1/wA×100 falls within the range, a large amount of the polyorganosiloxane blocks (A-2) are unevenly distributed in polycarbonate-polyorganosiloxane copolymers each having a higher molecular weight, and hence the impact resistance can be efficiently improved with respect to the average content of the polyorganosiloxane blocks (A-2) in the entirety of the polycarbonate-polyorganosiloxane copolymer.

Further, polycarbonate-polyorganosiloxane copolymers each having a higher molecular weight determined by using the polycarbonate as a conversion reference among the polycarbonate-polyorganosiloxane copolymers obtained through the separation of the polycarbonate-polyorganosiloxane copolymer by the gel permeation chromatography preferably have a higher average content of the polyorganosiloxane blocks (A-2). Specifically, the polycarbonate-polyorganosiloxane copolymer preferably satisfies the following expression (F2) and/or the following expression (F3):

$$wM2 < wM1 \tag{F2}$$

wherein wM1 and wM2 are as described above;

$$wM3 < wM2 \tag{F3}$$

wherein wM2 is as described above, and wM3 represents the average content (mass %) of the polyorganosiloxane blocks (A-2) in polycarbonate-polyorganosiloxane copolymers each having a molecular weight determined by using the polycarbonate as a conversion reference of from 4,500 or more to less than 16,000 among the polycarbonate-polyorganosiloxane copolymers obtained through the separation of the polycarbonate-polyorganosiloxane copolymer by the gel permeation chromatography.

The expression (F2) means that the average content (wM1) of the polyorganosiloxane blocks (A-2) in the polycarbonate-polyorganosiloxane copolymers each having a molecular weight of from 56,000 or more to 200,000 or less is larger than the average content (wM2) in the polycarbonate-polyorganosiloxane copolymers each having a molecular weight of from 16,000 or more to less than 56,000. The expression (F3) means that the average content (wM2) of the polyorganosiloxane blocks (A-2) in the polycarbonate-polyorganosiloxane copolymers each having a molecular weight of from 16,000 or more to less than 56,000 is larger than the average content (wM3) in the polycarbonate-polyorganosiloxane copolymers each having a molecular weight of from 4,500 or more to less than 16,000.

The polycarbonate-polyorganosiloxane copolymer preferably satisfies the expression (F2) and/or the expression (F3) because a larger amount of the polyorganosiloxane blocks (A-2) are unevenly distributed in polycarbonate-polyorganosiloxane copolymers each having a higher molecular weight, and hence the impact resistance can be more efficiently improved with respect to the average content of the polyorganosiloxane blocks (A-2) in the entirety of the polycarbonate-polyorganosiloxane copolymer.

The average chain length of the polyorganosiloxane blocks (A-2) in the polycarbonate-polyorganosiloxane copolymers each having a molecular weight determined by using the polycarbonate as a conversion reference of from 56,000 or more to 200,000 or less among the polycarbonate-polyorganosiloxane copolymers obtained through the separation of the polycarbonate-polyorganosiloxane copolymer by the gel permeation chromatography preferably satisfies the following expression (F4a) from the viewpoint that higher impact resistance is obtained:

$$50 \leq nM1 \tag{F4a}$$

wherein nM1 represents the average chain length of the polyorganosiloxane blocks (A-2) in the polycarbonate-polyorganosiloxane copolymers each having a molecular weight determined by using the polycarbonate as a conversion reference of from 56,000 or more to 200,000 or less among the polycarbonate-polyorganosiloxane copolymers obtained through the separation of the polycarbonate-polyorganosiloxane copolymer by the gel permeation chromatography.

The nM1 is preferably 50 or more, more preferably 60 or more, still more preferably 70 or more.

In addition, the average chain length (nA) of the polyorganosiloxane blocks (A-2) in the polycarbonate-polyorganosiloxane copolymer, and the average chain length (nM1) of the polyorganosiloxane blocks (A-2) in the polycarbonate-polyorganosiloxane copolymers each having a molecular weight determined by using the polycarbonate as a conversion reference of from 56,000 or more to 200,000 or less among the polycarbonate-polyorganosiloxane copolymers obtained through the separation of the polycarbonate-polyorganosiloxane copolymer by the gel permeation chromatography preferably satisfy the following expression (F4b):

$$100 < nM1/nA \times 100 \tag{F4b}$$

wherein the value of nM1/nA×100 is preferably more than 100, more preferably 105 or more, still more preferably 110 or more, still further more preferably 115 or more, particularly preferably 120 or more.

When the value of the nM1/nA×100 falls within the range, a large amount of the polyorganosiloxane blocks (A-2) each having a longer chain length are unevenly distributed in polycarbonate-polyorganosiloxane copolymers each having a higher molecular weight, and hence the impact resistance can be efficiently improved with respect to the average chain length of the polyorganosiloxane blocks (A-2) in the entirety of the polycarbonate-polyorganosiloxane copolymer.

Further, polycarbonate-polyorganosiloxane copolymers each having a higher molecular weight determined by using the polycarbonate as a conversion reference among the polycarbonate-polyorganosiloxane copolymers obtained through the separation of the polycarbonate-polyorganosiloxane copolymer by the gel permeation chromatography preferably have a longer average chain length of the polyorganosiloxane blocks (A-2).

Specifically, the copolymer preferably satisfies the following expression (F5) and/or the following expression (F6):

$$nM2 < nM1 \tag{F5}$$

wherein nM2 represents the average chain length of the polyorganosiloxane blocks (A-2) in polycarbonate-polyorganosiloxane copolymers each having a molecular weight determined by using the polycarbonate as a conversion reference of from 16,000 or more to less than 56,000 among the polycarbonate-polyorganosiloxane copolymers obtained through the separation of the polycarbonate-polyorganosiloxane copolymer by the gel permeation chromatography;

$$nM3 < nM2 \tag{F6}$$

wherein nM3 represents the average chain length of the polyorganosiloxane blocks (A-2) in polycarbonate-polyorganosiloxane copolymers each having a molecular weight determined by using the polycarbonate as a conversion reference of from 4,500 or more to less than 16,000 among the polycarbonate-polyorganosiloxane copolymers obtained through the separation of the polycarbonate-polyorganosiloxane copolymer by the gel permeation chromatography.

According to the expression (F5), the average chain length of the polyorganosiloxane blocks (A-2) in the polycarbonate-polyorganosiloxane copolymers each having a molecular weight determined by using the polycarbonate as a conversion reference of from 16,000 or more to less than 56,000 among the polycarbonate-polyorganosiloxane copolymers obtained through the separation of the polycarbonate-polyorganosiloxane copolymer by the gel permeation chromatography is preferably shorter than the average chain length of the polyorganosiloxane blocks (A-2) in the polycarbonate-polyorganosiloxane copolymers each having a molecular weight of from 56,000 or more to 200,000 or less.

According to the expression (F6), the average chain length of the polyorganosiloxane blocks (A-2) in the polycarbonate-polyorganosiloxane copolymers each having a molecular weight determined by using the polycarbonate as a conversion reference of from 4,500 or more to less than 16,000 among the polycarbonate-polyorganosiloxane copolymers obtained through the separation of the polycarbonate-polyorganosiloxane copolymer by the gel permeation chromatography is preferably shorter than the average chain length of the polyorganosiloxane blocks (A-2) in the polycarbonate-polyorganosiloxane copolymers each having a molecular weight of from 16,000 or more to less than 56,000.

That is, a large amount of the polyorganosiloxane blocks (A-2) each having a longer chain length are unevenly distributed in polycarbonate-polyorganosiloxane copolymers each having a higher molecular weight. Accordingly, the impact resistance can be more efficiently improved with respect to the average chain length of the polyorganosiloxane blocks (A-2) in the entirety of the polycarbonate-polyorganosiloxane copolymer.

The polycarbonate-polyorganosiloxane copolymers each having a molecular weight determined by using the polycarbonate as a conversion reference of from 56,000 or more to 200,000 or less among the polycarbonate-polyorganosiloxane copolymers obtained through the separation of the polycarbonate-polyorganosiloxane copolymer by the gel permeation chromatography preferably satisfy the following expression (F7a):

$$1.5 \leq iPOS/iPC \tag{F7a}$$

wherein iPOS represents the average content (mol) of linking groups of the polycarbonate blocks (A-1) and the polyorganosiloxane blocks (A-2), and iPC represents the average content (mol) of terminal groups of the polycarbonate blocks (A-1).

In addition, iA (iPOS/iPC) serving as the ratio of iPOS to iPC in the polycarbonate-polyorganosiloxane copolymer, and iM1 (iPOS/iPC) serving as the ratio of iPOS to iPC in the polycarbonate-polyorganosiloxane copolymers each having a molecular weight determined by using the polycarbonate as a conversion reference of from 56,000 or more to 200,000 or less among the polycarbonate-polyorganosiloxane copolymers obtained through the separation of the polycarbonate-polyorganosiloxane copolymer by the gel permeation chromatography preferably satisfy the following expression (F7b):

$$100 < iM1/iA \times 100 \tag{F7b}$$

wherein the value of iM1/iA×100 is preferably more than 100, more preferably 130 or more, still more preferably 150 or more, still further more preferably 200 or more, particularly preferably 250 or more.

When the value of the iM1/iA×100 falls within the range, a large amount of molecular chains formed of the polyorganosiloxane blocks (A-2) are unevenly distributed in polycarbonate-polyorganosiloxane copolymers each having a higher molecular weight, and hence the impact resistance can be efficiently improved with respect to the average number of the molecular chains formed of the polyorganosiloxane blocks (A-2) in the entirety of the polycarbonate-polyorganosiloxane copolymer.

Further, polycarbonate-polyorganosiloxane copolymers each having a higher molecular weight determined by using the polycarbonate as a conversion reference among the polycarbonate-polyorganosiloxane copolymers obtained through the separation of the polycarbonate-polyorganosiloxane copolymer by the gel permeation chromatography preferably have a higher value of the iPOS/iPC.

Specifically, the polycarbonate-polyorganosiloxane copolymer preferably satisfies the following expression (F8) and/or the following expression (F9):

$$iM2 < iM1 \tag{F8}$$

wherein iM1 is as described above, and iM2 represents the ratio (iPOS/iPC) of iPOS to iPC in polycarbonate-polyorganosiloxane copolymers each having a molecular weight determined by using the polycarbonate as a conversion reference of from 16,000 or more to less than 56,000 among the polycarbonate-polyorganosiloxane copolymers obtained through the separation of the polycarbonate-polyorganosiloxane copolymer by the gel permeation chromatography;

$$iM3 < iM2 \tag{F9}$$

wherein iM2 is as described above, and iM3 represents the ratio (iPOS/iPC) of iPOS to iPC in polycarbonate-polyorganosiloxane copolymers each having a molecular weight determined by using the polycarbonate as a conversion reference of from 4,500 or more to less than 16,000 among the polycarbonate-polyorganosiloxane copolymers obtained through the separation of the polycarbonate-polyorganosiloxane copolymer by the gel permeation chromatography.

The polycarbonate-polyorganosiloxane copolymer preferably satisfies the expression (F8) and/or the expression (F9) because a larger amount of molecular chains formed of the polyorganosiloxane blocks (A-2) are unevenly distributed in polycarbonate-polyorganosiloxane copolymers each having a higher molecular weight among the polycarbonate-polyorganosiloxane copolymers obtained through the separation of the polycarbonate-polyorganosiloxane copolymer by the gel permeation chromatography, and hence the impact resistance can be more efficiently improved with respect to the average number of the molecular chains formed of the polyorganosiloxane blocks (A-2) in the entirety of the polycarbonate-polyorganosiloxane copolymer.

<Flame-Retardant Polycarbonate-Based Resin Composition>

A flame-retardant polycarbonate-based resin composition according to a second embodiment of the present invention comprises: the polycarbonate-polyorganosiloxane copolymer (A); an aromatic polycarbonate-based resin (B) except the polycarbonate-polyorganosiloxane copolymer (A); and a flame retardant (C), wherein the flame retardant (C) is blended in an amount of from 0.001 part by mass or more to 20 parts by mass or less with respect to 100 parts by mass of the polycarbonate-polyorganosiloxane copolymer (A) and the aromatic polycarbonate-based resin (B):

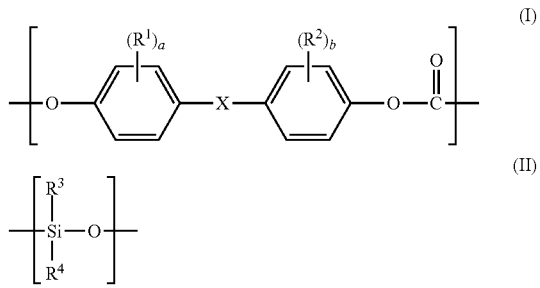

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

In the flame-retardant polycarbonate-based resin composition, the content of the polycarbonate-polyorganosiloxane copolymer (A) with respect to the total amount of the polycarbonate-polyorganosiloxane copolymer (A) and the aromatic polycarbonate-based resin (B) is typically 0.1 mass % or more, preferably 1 mass % or more, more preferably 3 mass % or more, still more preferably 5 mass % or more, particularly preferably 10 mass % or more, and is typically 99.9 mass % or less, preferably 99 mass % or less, more preferably 30 mass % or less, still more preferably 20 mass % or less, particularly preferably 18 mass % or less from the viewpoint of the impact resistance of the resin composition to be obtained.

The content of the aromatic polycarbonate-based resin (B) with respect to the total amount of the polycarbonate-polyorganosiloxane copolymer (A) and the aromatic polycarbonate-based resin (B) is typically 0.1 mass % or more, preferably 1 mass % or more, more preferably 50 mass % or more, still more preferably 80 mass % or more, and is typically 99.9 mass % or less, preferably 99 mass % or less, more preferably 98 mass % or less, still more preferably 95 mass % or less, particularly preferably 90 mass % or less from the viewpoint of the impact resistance of the resin composition to be obtained.

In one aspect of this embodiment, the total amount of the polycarbonate-polyorganosiloxane copolymer (A) and the aromatic polycarbonate-based resin (B) is 100 mass %.

In this embodiment, the mass ratio "(A)/(B)" of the polycarbonate-polyorganosiloxane copolymer (A) to the aromatic polycarbonate-based resin (B) is typically from 0.1/99.9 to 99.9/0.1, preferably from 1/99 to 99/1, more preferably from 2/98 to 50/50, still more preferably from 5/95 to 20/80 from the viewpoint of the impact resistance of the resin composition to be obtained.

The content of the polyorganosiloxane blocks (A-2) in a polycarbonate-based resin formed of the polycarbonate-polyorganosiloxane copolymer (A) and the aromatic polycarbonate-based resin (B) is preferably 0.1 mass % or more, more preferably 0.4 mass % or more, still more preferably 0.8 mass % or more, still further more preferably 1 mass % or more, particularly preferably 3 mass % or more, and is preferably 10 mass % or less, more preferably 7.0 mass % or less, still more preferably 6 mass % or less, particularly preferably 5 mass % or less, most preferably 4 mass % or less. When the content of the polyorganosiloxane blocks (A-2) in the polycarbonate-based resin falls within the range, an excellent impact-resisting characteristic can be obtained.

The viscosity-average molecular weight (Mv) of the polycarbonate-based resin formed of the polycarbonate-polyorganosiloxane copolymer (A) and the aromatic polycarbonate-based resin (B) may be appropriately adjusted by using, for example, a molecular weight modifier (terminal stopper) so as to be a target molecular weight in accordance with applications or products in which the polycarbonate-based resin is used. The viscosity-average molecular weight of the polycarbonate-based resin formed of the polycarbonate-polyorganosiloxane copolymer (A) and the aromatic polycarbonate-based resin (B) is preferably 9,000 or more, more preferably 12,000 or more, still more preferably 14,000 or more, particularly preferably 16,000 or more, and is preferably 50,000 or less, more preferably 30,000 or less, still more preferably 23,000 or less, particularly preferably 21,000 or less. When the viscosity-average molecular weight is 9,000 or more, a sufficient strength of a molded article can be obtained. When the viscosity-average molecular weight is 50,000 or less, injection molding or extrusion molding can be performed at the temperature at which the heat deterioration of the polycarbonate-based resin does not occur.

The viscosity-average molecular weight (Mv) is a value calculated from the following Schnell's equation by measuring the limiting viscosity [η] of a methylene chloride solution at 20° C.

$$[\eta]=1.23\times10^{-5}\times Mv^{0.83}$$

<(B) Aromatic Polycarbonate-Based Resin>

The aromatic polycarbonate-based resin (B) except the polycarbonate-polyorganosiloxane copolymer (A) includes, in a main chain thereof, a repeating unit represented by the following general formula (III). The polycarbonate-based resin is not particularly limited, and various known polycarbonate-based resins may each be used.

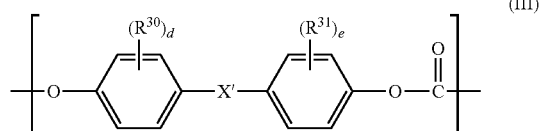

(III)

wherein $R^{30}$ and $R^{31}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "d" and "e" each independently represent an integer of from 0 to 4.

Specific examples of $R^{30}$ and $R^{31}$ include the same examples as those of $R^1$ and $R^2$, and preferred examples thereof are also the same as those of $R^1$ and $R^2$. $R^{30}$ and $R^{31}$ each more preferably represent an alkyl group having 1 to 6 carbon atoms or an alkoxy group having 1 to 6 carbon atoms. Specific examples of X' include the same examples as those of X, and preferred examples thereof are also the same as those of X. "d" and "e" each independently represent preferably from 0 to 2, more preferably 0 or 1.

Specifically, a resin obtained by a conventional production method for a polycarbonate may be used as the aromatic polycarbonate-based resin (B). Examples of the conventional method include: an interfacial polymerization method involving causing the dihydric phenol-based compound and phosgene to react with each other in the presence of an organic solvent inert to the reaction and an aqueous alkali solution, adding a polymerization catalyst, such as a tertiary amine or a quaternary ammonium salt, to the resultant, and polymerizing the mixture; and a pyridine method involving dissolving the dihydric phenol-based compound in pyridine or a mixed solution of pyridine and an inert solvent, and introducing phosgene to the solution to directly produce the resin.

A molecular weight modifier (terminal stopper), a branching agent, or the like is used as required in the reaction.

The dihydricphenol-based compound is, for example, a compound represented by the following general formula (III'):

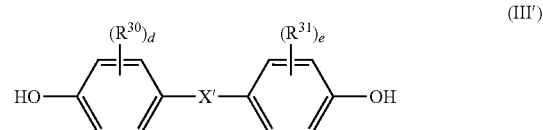

(III')

wherein $R^{30}$, $R^{31}$, X', "d", and "e" are as defined above, and preferred examples thereof are also the same as those described above.

Specific examples of the dihydric phenol-based compound may include those described above in the method of producing the polycarbonate-polyorganosiloxane copolymer (A), and preferred examples thereof are also the same as those described above. Among them, bis(hydroxyphenyl)alkane-based dihydric phenols are preferred, and bisphenol A is more preferred.

The aromatic polycarbonate-based resins may be used alone or in combination thereof. The aromatic polycarbonate resin (B) may have a structure free of such a polyorganosiloxane block as represented by the formula (II) unlike the polycarbonate-polyorganosiloxane copolymer (A). For example, the aromatic polycarbonate-based resin (B) may be a homopolycarbonate resin.

<Flame Retardant (C)>

Examples of the flame retardant (C) to be used in the flame-retardant polycarbonate-based resin composition of the present invention include an organic alkali metal salt, an organic alkali earth metal salt, and a phosphorus-based flame retardant. Those flame retardants may be used alone or in combination thereof. The flame retardant (C) is preferably any one of the organic alkali metal salt and the organic alkali earth metal salt (hereinafter sometimes collectively referred to as "organic alkali (earth) metal salts"), and the phosphorus-based flame retardant, and is more preferably the organic alkali metal salt or the phosphorus-based flame retardant.

Examples of the organic alkali (earth) metal salts include various metal salts; an alkali metal salt and organic alkali earth metal salt of an organic acid or organic acid ester having at least one carbon atom may each be used.

Herein, examples of the organic acid or the organic acid ester include an organic sulfonic acid and an organic carboxylic acid or esters thereof. Alkali metals may be, for example, lithium, sodium, potassium, and cesium, and alkali earth metals may be, for example, magnesium, calcium, strontium, and barium. Among the alkali metals, sodium and potassium are preferred, and potassium is particularly preferred from the viewpoints of flame retardancy and heat stability. In addition, a salt of the organic acid may be substituted with a halogen, such as fluorine, chlorine, or bromine. The organic alkali metal salts and the organic alkali earth metal salts may be used alone or in combination thereof.

In the case of, for example, an organic sulfonic acid among the various organic alkali metal salts and organic alkali earth metal salts, an alkali metal salt and alkali earth metal salt of a perfluoroalkanesulfonic acid represented by the following formula (11) are each preferably used:

$$(C_eF_{2e+1}SO_3)_fM \qquad (11)$$

wherein "e" represents an integer of from 1 to 10, M represents an alkali metal, such as lithium, sodium, potassium, or cesium, or an alkali earth metal, such as magnesium, calcium, strontium, or barium, and "f" represents a valence of M.

Compounds described in, for example, JP47-40445B1 correspond to those compounds.

Examples of the perfluoroalkanesulfonic acid represented by the formula (1) may include perfluoromethanesulfonic acid, perfluoroethanesulfonic acid, perfluoropropanesulfonic acid, perfluorobutanesulfonic acid, perfluoromethylbutanesulfonic acid, perfluorohexanesulfonic acid, perfluoroheptanesulfonic acid, and perfluorooctanesulfonic acid. Among them, potassium salts thereof are particularly preferably used. Examples of the salt of the organic sulfonic acid may include alkali metal salts of organic sulfonic acids, such as: p-toluenesulfonic acid; 2,5-dichlorobenzenesulfonic acid; 2,4,5-trichlorobenzenesulfonic acid; diphenylsulfone-3-sulfonic acid; diphenylsulfone-3,3'-disulfonic acid; and naphthalenetrisulfonic acid.

Examples of the organic carboxylic acid may include perfluoroformic acid, perfluoromethanecarboxylic acid, perfluoroethanecarboxylic acid, perfluoropropanecarboxylic acid, perfluorobutanecarboxylic acid, perfluoromethylbutanecarboxylic acid, perfluorohexanecarboxylic acid, perfluoroheptanecarboxylic acid, and perfluorooctanecarboxylic acid, and alkali metal salts of those organic carboxylic acids are used.

When the flame retardant (C) is an organic alkali (earth) metal salt, its blending amount is preferably 0.001 part by mass or more, more preferably 0.01 part by mass or more, still more preferably 0.02 part by mass or more with respect to 100 parts by mass of the resin formed of the polycarbonate-polyorganosiloxane copolymer (A) and the aromatic polycarbonate-based resin (B), and is preferably 1 part by mass or less, more preferably 0.1 part by mass or less, still more preferably 0.08 part by mass or less with respect thereto. When the blending amount falls within the range, more excellent flame retardancy is obtained.

Examples of the phosphorus-based flame retardant to be used in the flame-retardant polycarbonate-based resin composition of the present invention include red phosphorus and a phosphoric acid ester-based flame retardant.

The phosphoric acid ester-based flame retardant is particularly preferably free of any halogen, and examples thereof include monomers, oligomers, and polymers of phosphoric acid esters or mixtures thereof. Specific examples thereof include triphenyl phosphate, tricresyl phosphate, cresyl diphenyl phosphate, trixylenyl phosphate, tris(isopropylphenyl)phosphate, trinaphthyl phosphate, biphenol bisphosphate, bisphenol A bisphosphate, hydroquinone bisphosphate, resorcin bisphosphate, resorcinol-diphenyl phosphate, and trioxybenzene triphosphate, or substituted products and condensates thereof.

The phosphorus-based flame retardants may be used alone or in combination thereof.

When the flame retardant (C) is a phosphorus-based flame retardant, its blending amount is preferably 0.1 part by mass or more, more preferably 1 part by mass or more with respect to 100 parts by mass of the resin formed of the polycarbonate-polyorganosiloxane copolymer (A) and the aromatic polycarbonate-based resin (B), and is preferably 20 parts by mass or less, more preferably 15 parts by mass or less, still more preferably 10 parts by mass or less with respect thereto. When the blending amount is 0.1 part by mass or more, more excellent flame retardancy is obtained, and when the blending amount is 20 parts by mass or less, reductions in, for example, chemical resistance, heat resistance, tensile elongation, and impact resistance of the composition can be further suppressed.

<Flame Retardant Auxiliary (D)>

A polytetrafluoroethylene (PTFE) having a fibril-forming ability, the polytetrafluorethylene imparting flame retardancy, may be used as the flame retardant auxiliary (D) to be used in the flame-retardant polycarbonate-based resin composition of the present invention. The polytetrafluoroethylene serving as the flame retardant auxiliary (D) is blended for improving the anti-dripping effect and flame retardancy of the composition, and is not particularly limited, and a known polytetrafluoroethylene may be used. However, an aqueous dispersion-type polytetrafluoroethylene or an acryl-coated polytetrafluoroethylene is preferred.

The blending amount of the polytetrafluoroethylene serving as the flame retardant auxiliary (D) is preferably 0.01 part by mass or more, more preferably 0.05 part by mass or more, still more preferably 0.1 part by mass or more with respect to 100 parts by mass of the resin formed of the polycarbonate-polyorganosiloxane copolymer (A) and the aromatic polycarbonate-based resin (B), and is preferably 1 part by mass or less, more preferably 0.5 part by mass or less, still more preferably 0.4 part by mass or less with respect thereto. When the blending amount is 0.01 part by mass or more, higher flame retardancy can be obtained, and when the blending amount is 1 part by mass or less, an increase in amount of the aggregate of the polytetrafluoroethylene can be avoided.

<Other Components>

Any other additive may be incorporated into the flame-retardant polycarbonate-based resin composition of the present invention to the extent that the effects of the present invention are not impaired. Examples of the other additive may include an antioxidant, a UV absorber, a release agent, a reinforcing material, a filler, an elastomer for an impact resistance improvement, a dye, a pigment, an antistatic agent, and other resins except the polycarbonate.

The flame-retardant polycarbonate-based resin composition of the present invention is obtained by: blending the above-mentioned respective components at the above-mentioned ratios and various optional components to be used as required at appropriate ratios; and kneading the components.

In one aspect of the present invention, the total content of the component (A), the component (B), and the component (C) is preferably from 80 mass % to 100 mass %, more preferably from 95 mass % to 100 mass % with respect to the total amount (100 mass %) of the flame-retardant polycarbonate-based resin composition.

In another aspect of the present invention, the total content of the component (A), the component (B), the component (C), the component (D), and the above-mentioned other component is preferably from 90 mass % to 100 mass %, more preferably from 95 mass % to 100 mass % with respect to the total amount (100 mass %) of the flame-retardant polycarbonate-based resin composition.

The blending and the kneading may be performed by a method involving premixing with a typically used apparatus, such as a ribbon blender or a drum tumbler, and using, for example, a Henschel mixer, a Banbury mixer, a single-screw extruder, a twin-screw extruder, a multi-screw extruder, or a Ko-kneader. In normal cases, a heating temperature at the time of the kneading is appropriately selected from the range of from 240° C. or more to 320° C. or less. An extruder, in particular a vented extruder is preferably used in the melt-kneading.

[Molded Article]

Various molded bodies may each be produced by an injection molding method, an injection compression molding method, an extrusion molding method, a blow molding method, a press molding method, a vacuum molding method, an expansion molding method, or the like using as a raw material the melt-kneaded flame-retardant polycarbonate-based resin composition of the present invention or a pellet obtained through the melt-kneading. In particular, the pellet obtained through the melt-kneading can be suitably used in the production of injection-molded bodies by injection molding and injection compression molding.

The molded article comprising the flame-retardant polycarbonate-based resin composition of the present invention can be suitably used as, for example: a casing for a part for electrical and electronic equipment, such as a television, a radio, a video camera, a videotape recorder, an audio player, a DVD player, an air conditioner, a cellular phone, a display, a computer, a register, an electronic calculator, a copying machine, a printer, a facsimile, a communication base station, or a battery; or apart for an automobile and a building material.

EXAMPLES

The present invention is more specifically described by way of Examples. However, the present invention is by no means limited by these Examples. In each of Examples, characteristic values and evaluation results were determined in the following manner.

(1) Chain Length and Content of Polydimethylsiloxane

The chain length and content of a polydimethylsiloxane were calculated by NMR measurement from the integrated value ratio of a methyl group of the polydimethylsiloxane. In this description, the polydimethylsiloxane is sometimes abbreviated as PDMS.

<Quantification Method for Chain Length of Polydimethylsiloxane>

$^1$H-NMR Measurement Conditions

NMR apparatus: ECA500 manufactured by JEOL Resonance Co., Ltd.

Probe: 50TH5AT/FG2

Observed range: −5 ppm to 15 ppm

Observation center: 5 ppm

Pulse repetition time: 9 sec

Pulse width: 45°

NMR sample tube: 5 φ

Sample amount: 30 mg to 40 mg

Solvent: deuterochloroform

Measurement temperature: room temperature

Number of scans: 256 times

Allylphenol-terminated Polydimethylsiloxane

A: an integrated value of a methyl group in a dimethylsiloxane moiety observed around δ −0.02 to δ 0.5

B: an integrated value of a methylene group in allylphenol observed around δ 2.50 to δ 2.75

Chain length of polydimethylsiloxane=(A/6)/(B/4) Eugenol-terminated Polydimethylsiloxane A: an integrated value of a methyl group in a dimethylsiloxane moiety observed around δ −0.02 to δ 0.5

B: an integrated value of a methylene group in eugenol observed around δ 2.40 to δ 2.70

Chain length of polydimethylsiloxane=(A/6)/(B/4)

<Quantification Method for Content of Polydimethylsiloxane>

Quantification method for the copolymerization amount of a polydimethylsiloxane in a PTBP-terminated polycarbonate obtained by copolymerizing an allylphenol-terminated polydimethylsiloxane NMR apparatus: ECA-500 manufactured by JEOL Resonance Co., Ltd.

Probe: 50TH5AT/FG2

Observed range: −5 ppm to 15 ppm

Observation center: 5 ppm

Pulse repetition time: 9 sec

Pulse width: 45°

Number of scans: 256 times

NMR sample tube: 5 φ

Sample amount: 30 mg to 40 mg

Solvent: deuterochloroform

Measurement temperature: room temperature

A: an integrated value of a methyl group in a BPA moiety observed around δ 1.5 to δ 1.9

B: an integrated value of a methyl group in a dimethylsiloxane moiety observed around δ −0.02 to δ 0.3

C: an integrated value of a butyl group in a p-tert-butylphenyl moiety observed around δ 1.2 to δ 1.4 a=A/6 b=B/6 c=C/9

T=a+b+c f=a/T×100 g=b/T×100 h=c/T×100

TW=f×254+g×74.1+h×149

PDMS (wt %)=g×74.1/TW×100

(2) Viscosity-Average Molecular Weight

A viscosity-average molecular weight (Mv) was calculated from the following equation (Schnell's equation) by using a limiting viscosity [η] determined through the measurement of the viscosity of a methylene chloride solution at 20° C. with an Ubbelohde-type viscometer.

$[\eta]=1.23\times10^{-5}\times Mv^{0.83}$ (3) Gel Permeation Chromatography (GPC)

The GPC measurement of a polyorganosiloxane-polycarbonate copolymer was performed under the following conditions.

Test apparatus: PU-2080 manufactured by JASCO Corporation
Solvent: tetrahydrofuran (THF)
Column: TOSOH TSK-GEL MULTIPORE HXL-Mx2 and Shodex KR801
Column temperature: 40° C.
Flow rate: 1.0 mL/min
Detector: UV-2075 Plus (254 nm) manufactured by JASCO Corporation
Injection concentration: 10 mg/mL
Injection volume: 0.1 mL
Fraction collector: CHF122SC manufactured by Advantec Co., Ltd.

A standard polystyrene manufactured by Tosoh Corporation was used in the production of a calibration curve.

Under the above-mentioned conditions, the polyorganosiloxane-polycarbonate copolymer was fractionated into 5 fractions for respective retention times to provide fractions. The foregoing operation was repeated 100 times.

The average content and average chain length of the polyorganosiloxane blocks (A-2), the average content of the linking groups of the polycarbonate blocks (A-1) and the polyorganosiloxane blocks (A-2), and the average content of the terminal groups of the polycarbonate blocks (A-1) were determined by the above-mentioned $^1$H-NMR measurement for each of the resultant fractions.

In the GPC measurement, in a region corresponding to a molecular weight determined by using a polycarbonate as a conversion reference of from 360 or more to 1,300 or less, a cyclic organosiloxane is detected, and hence the average content and average chain length of the polyorganosiloxane blocks (A-2) apparently seem to be high.

<Production of Polycarbonate Oligomer>

Sodium dithionite was added in an amount of 2,000 ppm with respect to bisphenol A (BPA) (to be dissolved later) to 5.6 mass % aqueous sodium hydroxide, and then BPA was dissolved in the mixture so that the concentration of BPA was 13.5 mass %. Thus, a solution of BPA in aqueous sodium hydroxide was prepared. The solution of BPA in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of the reaction liquid was kept at 40° C. or less by passing cooling water through the jacket. The reaction liquid that had exited the tubular reactor was continuously introduced into a baffled vessel type reactor provided with a swept back blade and having an internal volume of 40 L. The solution of BPA in aqueous sodium hydroxide, 25 mass % aqueous sodium hydroxide, water, and a 1 mass % aqueous solution of triethylamine were further added to the reactor at flow rates of 2.8 L/hr, 0.07 L/hr, 17 L/hr, and 0.64 L/hr, respectively, to perform a reaction. An aqueous phase was separated and removed by continuously taking out the reaction liquid overflowing the vessel type reactor and leaving the reaction liquid at rest. Then, a methylene chloride phase was collected.

The polycarbonate oligomer thus obtained had a concentration of 341 g/L and a chloroformate group concentration of 0.71 mol/L.

Production Example 1

<PC-POS Copolymer (A-1a)>
Values for the following (i) to (xiv) are as shown in Table 1.
(i) L of the polycarbonate oligomer solution (PCO) produced as described above, (ii) L of methylene chloride (MC), a solution obtained by dissolving (iv) g of an allylphenol terminal-modified polydimethylsiloxane having an average chain length "n" of (iii) in (v) L of methylene chloride (MC), and (vi) mL of triethylamine (TEA) were loaded into a 50 L vessel-type reactor including a baffle board, a paddle-type stirring blade, and a cooling jacket. (vii) g of 6.4 mass % aqueous sodium hydroxide (NaOHaq) was added to the mixture under stirring, and a reaction between the polycarbonate oligomer and the allylphenol terminal-modified PDMS was performed for 20 minutes.

A solution of p-tert-butylphenol (PTBP) in methylene chloride (obtained by dissolving (viii) g of PTBP in (ix) L of methylene chloride (MC)) and a solution of BPA in aqueous sodium hydroxide (obtained by dissolving (xiii) g of BPA in an aqueous solution obtained by dissolving (x) g of NaOH and (xi) g of sodium dithionite ($Na_2S_2O_4$) in (xii) L of water) were added to the polymerization liquid, and the mixture was subjected to a polymerization reaction for 40 minutes.

(xiv) L of methylene chloride (MC) was added to the resultant for dilution, and the mixture was stirred for 10 minutes. After that, the mixture was separated into an organic phase containing a PC-POS, and an aqueous phase containing excess amounts of BPA and NaOH, and the organic phase was isolated.

A solution of the PC-POS in methylene chloride thus obtained was sequentially washed with 0.03 mol/L aqueous NaOH and 0.2 mol/L hydrochloric acid in amounts of 15 vol % each with respect to the solution. Next, the solution was repeatedly washed with pure water until an electric conductivity in an aqueous phase after the washing became 0.01 µS/m or less.

The solutions of the polycarbonates in methylene chloride obtained by the washing were concentrated and pulverized, and the resultant flakes were dried under reduced pressure at 120° C. to provide PC-POS copolymers (A1) to (A17). The resultant flake was subjected to the following various kinds of measurement: PDMS content measurement, unreacted PDMS amount measurement, viscosity-average molecular weight measurement, and measurement by GPC. The value of the iM1 of the flake was 3.2, the value of the iM2 thereof was 2.3, the value of the iM3 thereof was 0.7, and the value of the iM1/iA×100 thereof was 287. The other results are shown in Table 1.

TABLE 1

| | Production Example 1 | Production Example 2 |
|---|---|---|
| PC-POS (A) | A-1a | A-1b |
| (i) PCO (L) | 11 | 11 |
| (ii) MC (L) | 24.5 | 24.5 |
| (iii) PDMS chain length (n) | 61 | 88 |
| (iv) PDMS loading amount (g) | 1,800 | 1,400 |
| (v) MC (L) | 2.0 | 2.0 |
| (vi) TEA (mL) | 6.2 | 6.2 |
| (vii) NaOHaq (g) | 1,405 | 937 |
| (viii) PTBP (g) | 107.6 | 107.6 |
| (ix) MC (L) | 0.5 | 0.5 |
| (x) NaOH (g) | 412 | 412 |
| (xi) $Na_2S_2O_4$ (g) | 1.5 | 1.5 |
| (xii) Water (L) | 6.0 | 6.0 |
| (xiii) BPA (g) | 766 | 766 |
| (xiv) MC (L) | 0 | 0 |
| PDMS content (wt %) | 30 | 25 |
| Unreacted PDMS amount (ppm) | ≤150 | ≤150 |
| Mv | 17,700 | 17,700 |
| wM1 (mass %) | 48 | 41 |
| wM2 (mass %) | 30 | 36 |
| wM3 (mass %) | 21 | 23 |
| wM1/wA × 100 | 175 | 167 |

TABLE 1-continued

|  | Production Example 1 | Production Example 2 |
|---|---|---|
| nM1 | 76 | 122 |
| nM2 | 62 | 106 |
| nM3 | 52 | 84 |
| nM1/nA × 100 | 125 | 131 |

Production Example 2

<PC-POS Copolymer (A-1b)>
Production and measurement were performed in the same manner as in Production Example 1 except that the values (i) to (xiv) were changed as described in Table 1 shown above.
<PC-POS Copolymer (A-2)>
PC-POS copolymer A-2: "FG1700" [PC-POS copolymer, polyorganosiloxane block chain length: 88, polyorganosiloxane content: 6 mass %, viscosity-average molecular weight Mv: 17,700](see Table 1)
<Aromatic Polycarbonate-Based Resin (B)>
Aromatic polycarbonate-based resin B-1: "FN2500" [viscosity-average molecular weight Mv: 23,500]
Aromatic polycarbonate-based resin B-2: "FN2200" [viscosity-average molecular weight Mv: 21,300]
Aromatic polycarbonate-based resin B-3: "FN1900" [viscosity-average molecular weight Mv: 19,300]
Aromatic polycarbonate-based resin B-4: "FN1700" [viscosity-average molecular weight Mv: 17,700]
<Flame Retardant (C)>
Organic sulfonic acid alkali metal salt: "MEGAFACE F114 (product name)" [potassium perfluorobutanesulfonate, manufactured by DIC Corporation]
Phosphorus-based flame retardant: "CR-741 (product name) [bisphenol A bisdiphenyl phosphate, manufactured by Daihachi Chemical Industry Co., Ltd.]
Phosphorus-based flame retardant: "PX-202 (product name)" [biphenol bisdixylenyl phosphate, manufactured by Daihachi Chemical Industry Co., Ltd.]
Phosphorus-based flame retardant: "CR733S (product name)" [resorcinol bisdiphenyl phosphate, manufactured by Daihachi Chemical Industry Co., Ltd.]
<Flame Retardant Auxiliary (D)>
Polytetrafluoroethylene (PTFE): "A3800 (product name)" [50% of polytetrafluoroethylene and 50% of polyalkyl (meth)acrylate including an alkyl group having 4 or more carbon atoms, manufactured by Mitsubishi Rayon Co., Ltd.]
Polytetrafluoroethylene (PTFE): "CD097E (product name)" [100% of polytetrafluoroethylene, manufactured by AGC Inc.]
<Other Component>
Antioxidant: "IRGAFOS 168 (product name)" [tris(2,4-di-tert-butylphenyl) phosphite, manufactured by BASF Japan]

Examples a and b, Examples 1 to 28, and Comparative Examples 1 to 17

The PC-POS copolymers A-1a and A-1b obtained in Production Examples 1 and 2, and the other respective components were mixed at blending ratios shown in Table 2 to Table 7. Each of the mixtures was supplied to a vented twin-screw extruder (manufactured by Toshiba Machine Co., Ltd., TEM-35B), and was melt-kneaded at a screw revolution number of 150 rpm, an ejection amount of 20 kg/hr, and a resin temperature of from 278° C. to 300° C. to provide an evaluation pellet sample. The compositions and evaluation items of PC-based resin compositions are shown in Table 2 to Table 7.

TABLE 2

|  |  |  | Example a | Example b | Example 1 | Comparative Example 1 | Example 2 |
|---|---|---|---|---|---|---|---|
| A-1 | A-1a (Production Example 1) | parts by mass | 8 |  | 4 |  | 6 |
|  | A-1b (Production Example 2) | parts by mass |  | 9.6 |  |  |  |
| A-2 | FG1700 | parts by mass |  |  |  | 20 |  |
| B | B-1 (FN2500) | parts by mass |  |  |  |  |  |
|  | B-2 (FN2200) | parts by mass |  |  |  |  |  |
|  | B-3 (FN1900) | parts by mass |  |  | 63 | 65 | 63 |
|  | B-4 (FN1700) | parts by mass | 92 | 90.4 | 33 | 15 | 31 |
| C | MEGAFACE F114 | parts by mass |  |  | 0.03 | 0.03 | 0.03 |
| D | A3800 | parts by mass |  |  | 0.3 | 0.3 | 0.3 |
| Other | Irgafos 168 | parts by mass | 0.05 | 0.05 | 0.1 | 0.1 | 0.1 |
| Polyorganosiloxane block content in PC-based resin [(A) + (B)] | | mass % | 2.4 | 2.4 | 1.2 | 1.2 | 1.8 |
| Viscosity-average molecular weight (Mv) of PC-based resin [(A) + (B)] | | — | 17,700 | 17,700 | 18,700 | 18,700 | 18,700 |
| Q value | | ×0.01 ml/sec | 13 | 13 | 10 | 10 | 10 |
| Notched Izod impact strength (23° C.) | | kJ/m$^2$ | 73 | 74 | 79 | 77 | 77 |
| Notched Izod impact strength (−20° C.) | | kJ/m$^2$ | — | — | 66 | 59 | 69 |
| Notched Izod impact strength (−30° C.) | | kJ/m$^2$ | — | — | 30 | 22 | 57 |
| Notched Izod impact strength (−40° C.) | | kJ/m$^2$ | 54 | 53 | 21 | 16 | 26 |
| UL94 combustibility (1/16 inch) | | — | — | — | corresponding to V-0 | corresponding to V-0 | Corresponding to V-0 |
| Tensile break strength | | MPa | — | — | 71 | 70 | 69 |
| Tensile elongation | | % | — | — | 108 | 107 | 106 |
| Deflection temperature under load | | ° C. | 128 | 128 | 130 | 129 | 129 |

|  |  |  | Comparative Example 2 | Example 3 | Comparative Example 3 |
|---|---|---|---|---|---|
| A-1 | A-1a (Production Example 1) | parts by mass |  | 8 |  |
|  | A-1b (Production Example 2) | parts by mass |  |  |  |
| A-2 | FG1700 | parts by mass | 30 |  | 40 |

TABLE 2-continued

| | | | | | |
|---|---|---|---|---|---|
| B | B-1 (FN2500) | parts by mass | | | |
| | B-2 (FN2200) | parts by mass | | | 4 |
| | B-3 (FN1900) | parts by mass | 65 | 63 | 56 |
| | B-4 (FN1700) | parts by mass | 5 | 29 | |
| C | MEGAFACE F114 | parts by mass | 0.03 | 0.03 | 0.03 |
| D | A3800 | parts by mass | 0.3 | 0.3 | 0.3 |
| Other | Irgafos 168 | parts by mass | 0.1 | 0.1 | 0.1 |
| Polyorganosiloxane block content in PC-based resin [(A) + (B)] | | mass % | 1.8 | 2.4 | 2.4 |
| Viscosity-average molecular weight (Mv) of PC-based resin [(A) + (B)] | | — | 18,700 | 18,700 | 18,700 |
| Q value | | ×0.01 ml/sec | 10 | 10 | 10 |
| Notched Izod impact strength (23° C.) | | kJ/m$^2$ | 78 | 79 | 83 |
| Notched Izod impact strength (−20° C.) | | kJ/m$^2$ | 67 | 67 | 67 |
| Notched Izod impact strength (−30° C.) | | kJ/m$^2$ | 28 | 67 | 54 |
| Notched Izod impact strength (−40° C.) | | kJ/m$^2$ | 23 | 45 | 29 |
| UL94 combustibility (1/16 inch) | | — | Corresponding to V-0 | Corresponding to V-0 | Corresponding to V-0 |
| Tensile break strength | | MPa | 69 | 70 | 65 |
| Tensile elongation | | % | 105 | 111 | 96 |
| Deflection temperature under load | | ° C. | 129 | 129 | 128 |

| | | | Example 4 | Example 5 | Comparative Example 4 | Example 6 |
|---|---|---|---|---|---|---|
| A-1 | A-1a (Production Example 1) | parts by mass | 10 | | | 16 |
| | A-1b (Production Example 2) | parts by mass | | 12 | | |
| A-2 | FG1700 | parts by mass | | | 50 | |
| B | B-1 (FN2500) | parts by mass | | | | |
| | B-2 (FN2200) | parts by mass | | | 10 | |
| | B-3 (FN1900) | parts by mass | 63 | 64 | 40 | 71 |
| | B-4 (FN1700) | parts by mass | 27 | 24 | | 13 |
| C | MEGAFACE F114 | parts by mass | 0.03 | 0.03 | 0.03 | 0.03 |
| D | A3800 | parts by mass | 0.3 | 0.3 | 0.3 | 0.3 |
| Other | Irgafos 168 | parts by mass | 0.1 | 0.1 | 0.1 | 0.1 |
| Polyorganosiloxane block content in PC-based resin [(A) + (B)] | | mass % | 3.0 | 3.0 | 3.0 | 4.8 |
| Viscosity-average molecular weight (Mv) of PC-based resin [(A) + (B)] | | — | 18,700 | 18,700 | 18,700 | 18,700 |
| Q value | | ×0.01 ml/sec | 10 | 10 | 10 | 10 |
| Notched Izod impact strength (23° C.) | | kJ/m$^2$ | 77 | 81 | 82 | 85 |
| Notched Izod impact strength (−20° C.) | | kJ/m$^2$ | 70 | — | 70 | 84 |
| Notched Izod impact strength (−30° C.) | | kJ/m$^2$ | 67 | 67 | 67 | 84 |
| Notched Izod impact strength (−40° C.) | | kJ/m$^2$ | 62 | 67 | 49 | 81 |
| UL94 combustibility (1/16 inch) | | — | Corresponding to V-0 | Corresponding to V-0 | Corresponding to V-0 | Corresponding to V-0 |
| Tensile break strength | | MPa | 71 | 73 | 66 | 71 |
| Tensile elongation | | % | 113 | 119 | 100 | 120 |
| Deflection temperature under load | | ° C. | 128 | 129 | 128 | 128 |

| | | | Example 7 | Example 8 | Example 9 | Example 10 |
|---|---|---|---|---|---|---|
| A-1 | A-1a (Production Example 1) | parts by mass | | | 20 | |
| | A-1b (Production Example 2) | parts by mass | 19.2 | 19.2 | | 24 |
| A-2 | FG1700 | parts by mass | | | | |
| B | B-1 (FN2500) | parts by mass | | | | |
| | B-2 (FN2200) | parts by mass | 20 | 20 | | |
| | B-3 (FN1900) | parts by mass | | | 73 | 65 |
| | B-4 (FN1700) | parts by mass | 60.8 | 60.8 | 7 | 11 |
| C | MEGAFACE F114 | parts by mass | 0.02 | 0.03 | 0.03 | 0.03 |
| D | A3800 | parts by mass | 0.3 | 0.02 | 0.3 | 0.3 |
| Other | Irgafos 168 | parts by mass | 0.1 | 0.1 | 0.1 | 0.1 |
| Polyorganosiloxane block content in PC-based resin [(A) + (B)] | | mass % | 4.8 | 4.8 | 6 | 6 |
| Viscosity-average molecular weight (Mv) of PC-based resin [(A) + (B)] | | — | 18,700 | 18,700 | 18,700 | 18,700 |
| Q value | | ×0.01 ml/sec | 10 | 11 | 10 | 10 |
| Notched Izod impact strength (23° C.) | | kJ/m$^2$ | 79 | 78 | 81 | 81 |
| Notched Izod impact strength (−20° C.) | | kJ/m$^2$ | 72 | 69 | 86 | 71 |
| Notched Izod impact strength (−30° C.) | | kJ/m$^2$ | 69 | 69 | 89 | 69 |
| Notched Izod impact strength (−40° C.) | | kJ/m$^2$ | 70 | 69 | 80 | 66 |
| UL94 combustibility (1/16 inch) | | — | Corresponding to V-0 | Corresponding to V-0 | Corresponding to V-0 | Corresponding to V-0 |
| Tensile break strength | | MPa | 72 | 67 | 68 | 66 |
| Tensile elongation | | % | 121 | 109 | 112 | 108 |
| Deflection temperature under load | | ° C. | 127 | 128 | 126 | 127 |

TABLE 3

|  |  |  | Example 11 | Comparative Example 5 | Example 12 | Example 13 | Comparative Example 6 |
|---|---|---|---|---|---|---|---|
| A-1 | A-1a (Production Example 1) | parts by mass | 6 |  | 8 |  |  |
|  | A-1b (Production Example 2) | parts by mass |  |  |  | 9.6 |  |
| A-2 | FG1700 | parts by mass |  | 30 |  |  | 40 |
| B | B-1 (FN2500) | parts by mass |  |  |  |  | 11 |
|  | B-2 (FN2200) | parts by mass | 55 | 70 | 57 | 58.4 | 49 |
|  | B-3 (FN1900) | parts by mass | 39 |  | 35 | 32 |  |
|  | B-4 (FN1700) | parts by mass |  |  |  |  |  |
| C | MEGAFACE F114 | parts by mass | 0.03 | 0.03 | 0.03 | 0.03 | 0.03 |
| D | A3800 | parts by mass | 0.3 | 0.3 | 0.3 | 0.3 | 0.3 |
| Other | Irgafos 168 | parts by mass | 0.1 | 0.1 | 0.1 | 0.1 | 0.1 |
| Polyorganosiloxane block content in PC-based resin [(A) + (B)] |  | mass % | 1.8 | 1.8 | 2.4 | 2.4 | 2.4 |
| Viscosity-average molecular weight (Mv) of PC-based resin [(A) + (B)] |  | — | 20,300 | 20,300 | 20,300 | 20,300 | 20,300 |
| Q value |  | ×0.01 ml/sec | 6.7 | 6.8 | 6.7 | 6.5 | 6.7 |
| Notched Izod impact strength (23° C.) |  | kJ/m$^2$ | 85 | 88 | 86 | 87 | 87 |
| Notched Izod impact strength (−20° C.) |  | kJ/m$^2$ | 76 | 77 | 73 | 73 | 75 |
| Notched Izod impact strength (−30° C.) |  | kJ/m$^2$ | 65 | 41 | 73 | 73 | 65 |
| Notched Izod impact strength (−40° C.) |  | kJ/m$^2$ | 32 | 25 | 60 | 70 | 28 |
| UL94 combustibility (1/16 inch) |  | — | Corresponding to V-0 | Corresponding to V-0 | Corresponding to V-0 | Corresponding to V-0 | Corresponding to V-0 |
| Tensile break strength |  | MPa | 74 | 71 | 74 | 77 | 75 |
| Tensile elongation |  | % | 111 | 105 | 115 | 120 | 117 |
| Deflection temperature under load |  | ° C. | 130 | 130 | 130 | 130 | 129 |

TABLE 4

|  |  |  | Example 14 | Comparative Example 7 | Example 15 | Comparative Example 8 |
|---|---|---|---|---|---|---|
| A-1 | A-1a (Production Example 1) | parts by mass | 8 |  | 10 |  |
|  | A-1b (Production Example 2) | parts by mass |  |  |  |  |
| A-2 | FG1700 | parts by mass |  | 40 |  | 50 |
| B | B-1 (FN2500) | parts by mass |  |  |  |  |
|  | B-2 (FN2200) | parts by mass |  |  |  |  |
|  | B-3 (FN1900) | parts by mass |  |  |  |  |
|  | B-4 (FN1700) | parts by mass | 92 | 60 | 90 | 50 |
| C | MEGAFACE F114 | parts by mass | 0.03 | 0.03 | 0.03 | 0.03 |
| D | A3800 | parts by mass | 0.3 | 0.3 | 0.3 | 0.3 |
| Other | Irgafos 168 | parts by mass | 0.1 | 0.1 | 0.1 | 0.1 |
| Polyorganosiloxane block content in PC-based resin [(A) + (B)] |  | mass % | 2.4 | 2.4 | 3.0 | 3.0 |
| Viscosity-average molecular weight (Mv) of PC-based resin [(A) + (B)] |  | — | 17,700 | 17,700 | 17,700 | 17,700 |
| Q value |  | ×0.01 ml/sec | 12 | 13 | 13 | 13 |
| Notched Izod impact strength (23° C.) |  | kJ/m$^2$ | 73 | 72 | 72 | 75 |
| Notched Izod impact strength (−20° C.) |  | kJ/m$^2$ | 68 | 62 | 71 | — |
| Notched Izod impact strength (−30° C.) |  | kJ/m$^2$ | 61 | 43 | 71 | 60 |
| Notched Izod impact strength (−40° C.) |  | kJ/m$^2$ | 44 | 25 | 66 | 47 |
| UL94 combustibility (1/16 inch) |  | — | Corresponding to V-0 | Corresponding to V-0 | Corresponding to V-0 | Corresponding to V-0 |
| Tensile break strength |  | MPa | 66 | 58 | 66 | 66 |
| Tensile elongation |  | % | 104 | 81 | 103 | 104 |
| Deflection temperature under load |  | ° C. | 128 | 127 | 128 | 128 |

TABLE 5

|  |  |  | Example 16 | Comparative Example 9 | Example 17 | Comparative Example 10 | Example 18 | Example 19 |
|---|---|---|---|---|---|---|---|---|
| A-1 | A-1a (Production Example 1) | parts by mass | 6 |  | 8 |  | 10 | 12 |
|  | A-1b (Production Example 2) | parts by mass |  |  |  |  |  |  |
| A-2 | FG1700 | parts by mass |  | 30 |  | 40 |  |  |
| B | B-1 (FN2500) | parts by mass |  |  |  |  |  |  |
|  | B-2 (FN2200) | parts by mass |  |  |  |  |  |  |
|  | B-3 (FN1900) | parts by mass |  |  |  |  |  |  |
|  | B-4 (FN1700) | parts by mass | 94 | 70 | 92 | 60 | 90 | 88 |
| C | CR741 | parts by mass | 1.5 | 1.5 | 1.5 | 1.5 | 1.5 | 1.5 |
|  | PX202 | parts by mass |  |  |  |  |  |  |
|  | CR733S | parts by mass |  |  |  |  |  |  |
| D | CD097E | parts by mass | 0.30 | 0.30 | 0.30 | 0.30 | 0.30 | 0.30 |

TABLE 5-continued

|  |  |  |  |  |  |  |  |  |
|---|---|---|---|---|---|---|---|---|
| Other | Irgafos 168 | parts by mass | 0.10 | 0.10 | 0.10 | 0.10 | 0.10 | 0.10 |
| Polyorganosiloxane block content In PC-based resin [(A) + (B)] | | mass % | 1.8 | 1.8 | 2.4 | 2.4 | 3.0 | 3.6 |
| Viscosity-average molecular weight (Mv) of PC-based resin [(A) + (B)] | | — | 17,700 | 17,700 | 17,700 | 17,700 | 17,700 | 17,700 |
| MFR (300° C., 1.2 kg) | | g/10 min | 18 | 18 | 17 | 17 | 14 | 13 |
| Q value (280° C., 160 kg) | | ×0.01 ml/sec | 14 | 14 | 14 | 14 | 13 | 14 |
| Izod impact strength (23° C.) | | kJ/m² | 72 | 69 | 77 | 74 | 77 | 83 |
| Izod impat strength (−20° C.) | | kJ/m² | 31 | 19 | 66 | 45 | 62 | 66 |
| Izod impact strength (−30° C.) | | kJ/m² | 28 | 18 | 31 | 22 | 43 | 60 |
| Izod impact strength (−40° C.) | | kJ/m² | 20 | 16 | 25 | 19 | 25 | 53 |
| UL94 combustibility (1/16 inch) | | — | V-0 | V-0 | V-0 | V-0 | V-0 | V-0 |
| Tensile break strength | | MPa | 68 | 63 | 65 | 61 | 65 | 68 |
| Tensile elongation | | % | 105 | 87 | 96 | 85 | 100 | 111 |
| Deflection temperature under load | | ° C. | 123 | 123 | 123 | 123 | 123 | 123 |

|  |  |  |  | Example 20 | Comparative Example 11 | Example 21 | Comparative Example 12 |
|---|---|---|---|---|---|---|---|
| A-1 | A-1a (Production Example 1) | | parts by mass | 6 | | 20 | |
|  | A-1b (Production Example 2) | | parts by mass | | | | |
| A-2 | FG1700 | | parts by mass | | 30 | | 100 |
| B | B-1 (FN2500) | | parts by mass | 29 | 27 | | |
|  | B-2 (FN2200) | | parts by mass | 40 | 43 | | |
|  | B-3 (FN1900) | | parts by mass | | | | |
|  | B-4 (FN1700) | | parts by mass | 25 | | 80 | |
| C | CR741 | | parts by mass | 1.5 | 1.5 | | |
|  | PX202 | | parts by mass | | | 1.5 | 1.5 |
|  | CR733S | | parts by mass | | | | |
| D | CD097E | | parts by mass | 0.30 | 0.30 | 0.30 | 0.30 |
| Other | Irgafos 168 | | parts by mass | 0.10 | 0.10 | 0.10 | 0.10 |
| Polyorganosiloxane block content In PC-based resin [(A) + (B)] | | | mass % | 1.8 | 1.8 | 6.0 | 6.0 |
| Viscosity-average molecular weight (Mv) of PC-based resin [(A) + (B)] | | | — | 20,800 | 20,800 | 17,700 | 17,700 |
| MFR (300° C., 1.2 kg) | | | g/10 min | 9 | 8 | 10 | 11 |
| Q value (280° C., 160 kg) | | | ×0.01 ml/sec | 7 | 7 | 13 | 14 |
| Izod impact strength (23° C.) | | | kJ/m² | 88 | 89 | 95 | 69 |
| Izod impact strength (−20° C.) | | | kJ/m² | 72 | 53 | 81 | 61 |
| Izod impact strength (−30° C.) | | | kJ/m² | 30 | 19 | 86 | 54 |
| Izod impact strength (−40° C.) | | | kJ/m² | 22 | 18 | 86 | 49 |
| UL94 combustibility (1/16 inch) | | | — | V-0 | V-0 | V-0 | V-0 |
| Tensile break strength | | | MPa | 77 | 70 | 65 | 53 |
| Tensile elongation | | | % | 117 | 100 | 111 | 77 |
| Deflection temperature under load | | | ° C. | 126 | 125 | 122 | 122 |

TABLE 6

|  |  |  | Example 22 | Example 23 | Comparative Example 13 | Example 24 | Comparative Example 14 | Example 25 | Comparative Example 15 |
|---|---|---|---|---|---|---|---|---|---|
| A-1 | A-1a (Production Example 1) | parts by mass | 16 | | | 10 | | 8 | |
|  | A-1b (Production Example 2) | parts by mass | | 19.2 | | | | | |
| A-2 | FG1700 | parts by mass | | | 80 | | 50 | | 40 |
| B | B-1 (FN2500) | parts by mass | | | | 50 | 50 | 60 | 60 |
|  | B-2 (FN2200) | parts by mass | 20 | 20 | 20 | | | | |
|  | B-3 (FN1900) | parts by mass | | | | | | | |
|  | B-4 (FN1700) | parts by mass | 64 | 60.8 | | 40 | | 32 | |
| C | CR741 | parts by mass | 3.1 | 3.1 | 3.1 | 3.1 | 3.1 | 3.1 | 3.1 |
|  | PX202 | parts by mass | | | | | | | |
|  | CR733S | parts by mass | | | | | | | |
| D | CD097E | parts by mass | 0.30 | 0.30 | 0.30 | 0.30 | 0.30 | 0.30 | 0.30 |
| Other | Irgafos 168 | parts by mass | 0.10 | 0.10 | 0.10 | 0.10 | 0.10 | 0.10 | 0.10 |
| Polyorganosiloxane block content in PC-based resin [(A) + (B)] | | mass % | 4.8 | 4.8 | 4.8 | 3 | 3 | 2.4 | 2.4 |
| Viscosity-average molecular weight (Mv) of PC-based resin [(A) + (B)] | | — | 18,400 | 18,400 | 18,400 | 20,600 | 20,600 | 21,200 | 21,200 |
| MFR (300° C., 1.2 kg) | | g/10 min | 14 | 11 | 15 | 9 | 9 | 7 | 9 |
| Q value (280° C., 160 kg) | | ×0.01 ml/sec | 14 | 14 | 14 | 8 | 8 | 7 | 7 |
| Izod impact strength (23° C.) | | kJ/m² | 98 | 88 | 78 | 89 | 91 | 91 | 94 |
| Izod impact strength (−20° C.) | | kJ/m² | 90 | 70 | 67 | 75 | 72 | 77 | 67 |
| Izod impact strength (−30° C.) | | kJ/m² | 84 | 69 | 59 | 72 | 61 | 76 | 21 |
| Izod impact strength (−40° C.) | | kJ/m² | 77 | 60 | 47 | 67 | 21 | 67 | 18 |
| UL94 combustibility (1/16 inch) | | — | V-0 | V-0 | V-0 | V-0 | V-0 | V-0 | V-0 |
| Tensile break strength | | MPa | 69 | 67 | 64 | 77 | 65 | 74 | 78 |

TABLE 6-continued

|  |  | Example 22 | Example 23 | Comparative Example 13 | Example 24 | Comparative Example 14 | Example 25 | Comparative Example 15 |
|---|---|---|---|---|---|---|---|---|
| Tensile elongation | % | 110 | 105 | 95 | 118 | 91 | 113 | 116 |
| Deflection temperature under load | ° C. | 117 | 118 | 117 | 120 | 119 | 119 | 120 |

TABLE 7

|  |  |  | Example 26 | Comparative Example 16 | Example 27 | Example 28 | Comparative Example 17 |
|---|---|---|---|---|---|---|---|
| A-1 | A-1a (Production Example 1) | parts by mass | 16 |  | 16 |  |  |
|  | A-1b (Production Example 2) | parts by mass |  |  |  | 19.2 |  |
| A-2 | FG1700 | parts by mass |  | 80 |  |  | 80 |
| B | B-1 (FN2500) | parts by mass |  |  |  |  |  |
|  | B-2 (FN2200) | parts by mass | 20 | 20 | 20 | 20 | 20 |
|  | B-3 (FN1900) | parts by mass |  |  |  |  |  |
|  | B-4 (FN1700) | parts by mass | 64 |  | 64 | 60.8 |  |
| C | CR741 | parts by mass | 4.7 | 4.7 | 6.4 | 6.4 | 6.4 |
|  | PX202 | parts by mass |  |  |  |  |  |
|  | CR733S | parts by mass |  |  |  |  |  |
| D | CD097E | parts by mass | 0.30 | 0.30 | 0.30 | 0.30 | 0.30 |
| Other | Irgafos 168 | parts by mass | 0.10 | 0.10 | 0.10 | 0.10 | 0.10 |
| Polyorganosiloxane block content in PC-based resin [(A) + (B)] | | mass % | 4.8 | 4.8 | 4.8 | 4.8 | 4.8 |
| Viscosity-average molecular weight (Mv) of PC-based resin [(A) + (B)] | | — | 18,400 | 18,400 | 18,400 | 18,400 | 18,400 |
| MFR (300° C., 1.2 kg) | | g/10 min | 17 | 17 | 20 | 16 | 20 |
| Q value (280° C., 160 kg) | | ×0.01 ml/sec | 17 | 17 | 19 | 19 | 19 |
| Izod impact strength (23° C.) | | kJ/m$^2$ | 91 | 77 | 94 | 89 | 74 |
| Izod impact strength (−20° C.) | | kJ/m$^2$ | 80 | 62 | 71 | 68 | 57 |
| Izod impact strength (−30° C.) | | kJ/m$^2$ | 72 | 57 | 72 | 63 | 45 |
| Izod impact strength (−40° C.) | | kJ/m$^2$ | 71 | 25 | 68 | 61 | 18 |
| UL94 combustibility (1/16 inch) | | — | V-0 | V-0 | V-0 | V-0 | V-0 |
| Tensile break strength | | MPa | 70 | 61 | 73 | 68 | 64 |
| Tensile elongation | | % | 112 | 92 | 120 | 105 | 93 |
| Deflection temperature under load | | ° C. | 112 | 112 | 109 | 109 | 108 |

[Evaluation Test]
<Fluidity Evaluation> (MFR)

The amount (g/10 min) of a molten resin flowing out of a die having a diameter of 2.095±0.005 mm and a length of 8.000±0.025 mm was measured by using the above-mentioned pellet in conformity with JIS K 7210-1:2014 at 300° C. under a load of 1.2 kg.

<Q value (flow value) [unit; $10^{-2}$ mL/sec]>

The amount (mL/sec) of a molten resin flowing out of a nozzle having a diameter of 1.00 mm and a length of 10.00 mm was measured by using the above-mentioned pellet and a Koka flow tester in conformity with JIS K 7210-1:2014: Appendix JA at 280° C. under a pressure of 160 kgf. A Q value represents an outflow amount per unit time, and a higher numerical value therefor means that the fluidity of the resin is better.

<Impact Resistance>

The pellet obtained in the foregoing was dried at 120° C. for 8 hours, and was then subjected to injection molding with an injection molding machine (manufactured by Nissei Plastic Industrial Co., Ltd., NEX110, screw diameter: 36 mmφ) at a cylinder temperature of 280° C. and a die temperature of 80° C. to produce an Izod test piece (length: 63.5 mm, width: 12.7 mm, thickness: 3.2 mm). Notched Izod impact strengths at −40° C., −30° C., −20° C., and 23° C. were measured by using a test piece obtained by making a notch (r=0.25 mm±0.05 mm) in the test piece through post-processing in conformity with ASTM Standard D-256.

<Flame Retardancy Evaluation>

The pellet obtained in the foregoing was dried at 120° C. for 8 hours, and was then subjected to injection molding with an injection molding machine (manufactured by Nissei Plastic Industrial Co., Ltd., NEX110, screw diameter: 36 mmφ) at a cylinder temperature of 280° C. and a die temperature of 80° C. to provide a test piece having a thickness of from 1.59 mm to 1.64 mm (length: 127 mm, width: 12.7 mm). The test piece was subjected to a vertical flame test in conformity with an Underwriters Laboratory Subject 94 (UL94) flame test, and was evaluated for its flame retardancy by being classified into any one of V-0, V-1, and V-2. A test piece classified into V-0 means that the test piece is excellent in flame retardancy.

<Tensile Break Strength (Unit; MPa)>

The pellet obtained in the foregoing was dried at 120° C. for 8 hours, and was then subjected to injection molding with an injection molding machine (manufactured by Nissei Plastic Industrial Co., Ltd., NEX110, screw diameter: 36 mmφ) at a cylinder temperature of 280° C. and a die temperature of 80° C. to produce a dumbbell-type test piece (parallel portion: length: 60 mm, width: 10 mm, thickness: 3.2 mm). The tensile break strength of the test piece was measured at a test speed of 50 mm/min, a chuck-to-chuck distance of 115 mm, and a temperature of 23° C. in conformity with ASTM Standard D-638.

<Tensile Elongation (Unit; %)>

The pellet obtained in the foregoing was dried at 120° C. for 8 hours, and was then subjected to injection molding with an injection molding machine (manufactured by Nissei Plastic Industrial Co., Ltd., NEX110, screw diameter: 36 mmφ) at a cylinder temperature of 280° C. and a die temperature of 80° C. to produce a dumbbell-type test piece (parallel portion: length: 60 mm, width: 10 mm, thickness:

3.2 mm). The tensile elongation of the test piece was measured at a test speed of 50 mm/min, a chuck-to-chuck distance of 115 mm, and a temperature of 23° C. in conformity with ASTM Standard D-638.

<Deflection Temperature Under Load (Unit; ° C.)>

The pellet obtained in the foregoing was dried at 120° C. for 8 hours, and was then subjected to injection molding with an injection molding machine (manufactured by Nissei Plastic Industrial Co., Ltd., NEX110, screw diameter: 36 mmφ) at a cylinder temperature of 280° C. and a die temperature of 80° C. to provide a test piece (length: 127 mm, width: 12.7 mm, thickness: 3.2 mm). A load of 1.8 MPa was applied to the test piece in conformity with ASTM Standard D-648 at a rate of temperature increase of 120° C./h and a fulcrum-to-fulcrum distance of 100 mm, and the temperature at which the deflection of the test piece measured in an edgewise manner reached 0.26 mm was recorded.

INDUSTRIAL APPLICABILITY

The flame-retardant polycarbonate resin obtained in the present invention can be suitably used as a casing and the like for a part for electrical and electronic equipment, and a part and the like for an automobile and a building material because the resin is excellent in flame retardancy and impact resistance.

The invention claimed is:

1. A polycarbonate-polyorganosiloxane copolymer, comprising:
   polycarbonate blocks (A-1) each formed of a repeating unit represented by the following general formula (I), and
   polyorganosiloxane blocks (A-2) each containing a repeating unit represented by the following general formula (II),
   wherein the polycarbonate-polyorganosiloxane copolymer satisfies the following expression (F1a):

$15 \leq wM1$ (F1a)

wherein wM1 represents an average content (mass %) of the polyorganosiloxane blocks (A-2) in polycarbonate-polyorganosiloxane copolymers each having a molecular weight determined by using a polycarbonate as a conversion reference of from 56,000 or more to 200,000 or less among polycarbonate-polyorganosiloxane copolymers obtained through separation of the polycarbonate-polyorganosiloxane copolymer by gel permeation chromatography,

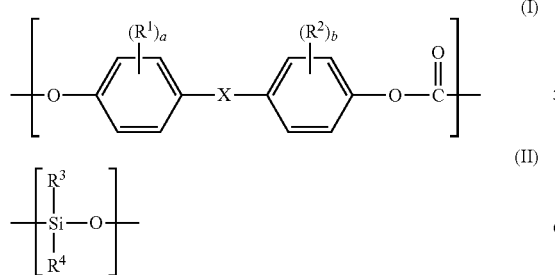

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4;

wherein the polycarbonate-polyorganosiloxane copolymer satisfies the following expression (F1a'):

$13 \leq wM2$ (F1a')

wherein wM2 represents an average content (mass %) of the polyorganosiloxane blocks (A-2) in polycarbonate-polyorganosiloxane copolymers each having a molecular weight determined by using the polycarbonate as a conversion reference of from 16,000 or more to less than 56,000 among the polycarbonate-polyorganosiloxane copolymers obtained through the separation of the polycarbonate-polyorganosiloxane copolymer by the gel permeation chromatography.

2. A polycarbonate-polyorganosiloxane copolymer, comprising:
   polycarbonate blocks (A-1) each formed of a repeating unit represented by the following general formula (I); and
   polyorganosiloxane blocks (A-2) each containing a repeating unit represented by the following general formula (II),
   wherein the polycarbonate-polyorganosiloxane copolymer satisfies the following expression (F1a):

$15 \leq wM1$ (F1a)

wherein wM1 represents an average content (mass %) of the polyorganosiloxane blocks (A-2) in polycarbonate-polyorganosiloxane copolymers each having a molecular weight determined by using a polycarbonate as a conversion reference of from 56,000 or more to 200,000 or less among polycarbonate-polyorganosiloxane copolymers obtained through separation of the polycarbonate-polyorganosiloxane copolymer by gel permeation chromatography,

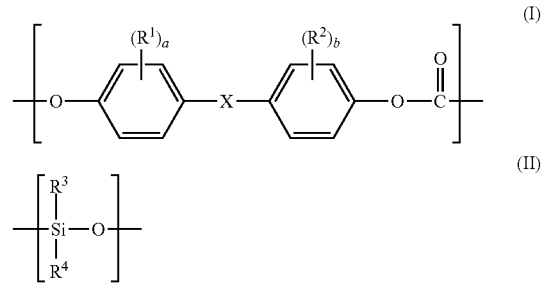

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, R$^3$ and R$^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4 wherein the polycarbonate-polyorganosiloxane copolymer satisfies the following expression (F1b):

$$100 < wM1/wA \times 100 \tag{F1b}$$

wherein wM1 is as described above, and wA represents an average content (mass %) of the polyorganosiloxane blocks (A-2) in the polycarbonate-polyorganosiloxane copolymer.

3. The polycarbonate-polyorganosiloxane copolymer according to claim 1, wherein the polycarbonate-polyorganosiloxane copolymer satisfies the following expression (F2):

$$wM2 < wM1 \tag{F2}$$

wherein wM1 and wM2 are as described above.

4. The polycarbonate-polyorganosiloxane copolymer according to claim 1, wherein the polycarbonate-polyorganosiloxane copolymer satisfies the following expression (F3):

$$wM3 < wM2 \tag{F3}$$

wherein wM2 is as described above, and wM3 represents an average content (mass %) of the polyorganosiloxane blocks (A-2) in polycarbonate-polyorganosiloxane copolymers each having a molecular weight determined by using the polycarbonate as a conversion reference of from 4,500 or more to less than 16,000 among the polycarbonate-polyorganosiloxane copolymers obtained through the separation of the polycarbonate-polyorganosiloxane copolymer by the gel permeation chromatography.

5. A polycarbonate-polyorganosiloxane copolymer, comprising:
polycarbonate blocks (A-1) each formed of a repeating unit represented by the following general formula (I), and
polyorganosiloxane blocks (A-2) each containing a repeating unit represented by the following general formula (II),
wherein the polycarbonate-polyorganosiloxane copolymer satisfies the following expression (F1a):

$$15 \leq wM1 \tag{F1a}$$

wherein wM1 represents an average content (mass %) of the polyorganosiloxane blocks (A-2) in polycarbonate-polyorganosiloxane copolymers each having a molecular weight determined by using a polycarbonate as a conversion reference of from 56,000 or more to 200,000 or less among polycarbonate-polyorganosiloxane copolymers obtained through separation of the polycarbonate-polyorganosiloxane copolymer by gel permeation chromatography;

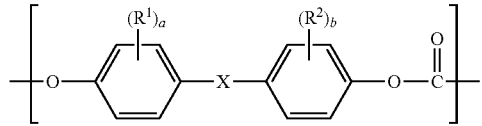

(I)

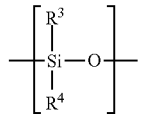

(II)

wherein R$^1$ and R$^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, R$^3$ and R$^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4;

wherein the polycarbonate-polyorganosiloxane copolymer satisfies the following expression (F4a):

$$50 \leq nM1 \tag{F4a}$$

wherein nM1 represents an average chain length of the polyorganosiloxane blocks (A-2) in the polycarbonate-polyorganosiloxane copolymers each having a molecular weight determined by using the polycarbonate as a conversion reference of from 56,000 or more to 200,000 or less among the polycarbonate-polyorganosiloxane copolymers obtained through the separation of the polycarbonate-polyorganosiloxane copolymer by the gel permeation chromatography, and wherein the polycarbonate-polyorganosiloxane copolymer satisfies the following expression (F4b):

$$100 < nM1/nA \times 100 \tag{F4b}$$

wherein nM1 is as described above, and nA represents an average chain length of the polyorganosiloxane blocks (A-2) in the polycarbonate-polyorganosiloxane copolymer.

6. A polycarbonate-polyorganosiloxane copolymer, comprising:
polycarbonate blocks (A-1) each formed of a repeating unit represented by the following general formula (I), and
polyorganosiloxane blocks (A-2) each containing a repeating unit represented by the following general formula (II),
wherein the polycarbonate-polyorganosiloxane copolymer satisfies the following expression (F1a):

$$15 \leq wM1 \tag{F1a}$$

wherein wM1 represents an average content (mass %) of the polyorganosiloxane blocks (A-2) in polycarbonate-polyorganosiloxane copolymers each having a molecular weight determined by using a polycarbonate as a conversion reference of from 56,000 or more to 200,000 or less among polycarbonate-polyorganosiloxane copolymers obtained through separation of the polycarbonate-polyorganosiloxane copolymer by gel permeation chromatography,

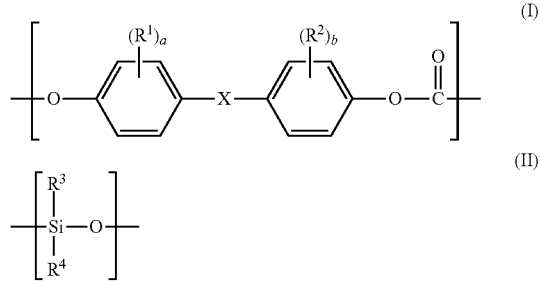

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4;

wherein the polycarbonate-polyorganosiloxane copolymer satisfies the following expression (F4a):

$50 \le nM1$ (F4a)

wherein nM1 represents an average chain length of the polyorganosiloxane blocks (A-2) in the polycarbonate-polyorganosiloxane copolymers each having a molecular weight determined by using the polycarbonate as a conversion reference of from 56,000 or more to 200,000 or less among the polycarbonate-polyorganosiloxane copolymers obtained through the separation of the polycarbonate-polyorganosiloxane copolymer by the gel permeation chromatography, and wherein the polycarbonate-polyorganosiloxane copolymer satisfies the following expression (F5):

$nM2 < nM1$ (F5)

wherein nM1 is as described above, and nM2 represents an average chain length of the polyorganosiloxane blocks (A-2) in polycarbonate-polyorganosiloxane copolymers each having a molecular weight determined by using the polycarbonate as a conversion reference of from 16,000 or more to less than 56,000 among the polycarbonate-polyorganosiloxane copolymers obtained through the separation of the polycarbonate-polyorganosiloxane copolymer by the gel permeation chromatography.

7. The polycarbonate-polyorganosiloxane copolymer according to claim 6, wherein the polycarbonate-polyorganosiloxane copolymer satisfies the following expression (F6):

$nM3 < nM2$ (F6)

wherein nM2 is as described above, and nM3 represents an average chain length of the polyorganosiloxane blocks (A-2) in polycarbonate-polyorganosiloxane copolymers each having a molecular weight determined by using the polycarbonate as a conversion reference of from 4,500 or more to less than 16,000 among the polycarbonate-polyorganosiloxane copolymers obtained through the separation of the polycarbonate-polyorganosiloxane copolymer by the gel permeation chromatography.

8. A polycarbonate-polyorganosiloxane copolymer, comprising:
polycarbonate blocks (A-1) each formed of a repeating unit represented by the following general formula (I), and
polyorganosiloxane blocks (A-2) each containing a repeating unit represented by the following general formula (II),
wherein the polycarbonate-polyorganosiloxane copolymer satisfies the following expression (F1a):

$15 \le wM1$ (F1a)

wherein wM1 represents an average content (mass %) of the polyorganosiloxane blocks (A-2) in polycarbonate-polyorganosiloxane copolymers each having a molecular weight determined by using a polycarbonate as a conversion reference of from 56,000 or more to 200,000 or less among polycarbonate-polyorganosiloxane copolymers obtained through separation of the polycarbonate-polyorganosiloxane copolymer by gel permeation chromatography;

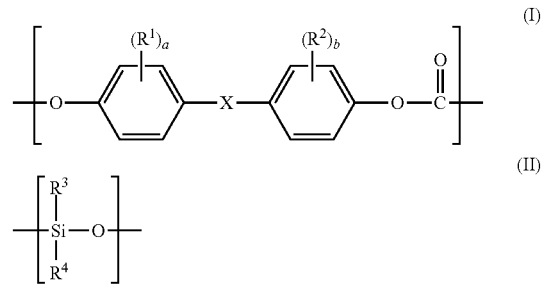

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4;

wherein the polycarbonate-polyorganosiloxane copolymers each having a molecular weight determined by using the polycarbonate as a conversion reference of from 56,000 or more to 200,000 or less among the polycarbonate-polyorganosiloxane copolymers obtained through the separation of the polycarbonate-polyorganosiloxane copolymer by the gel permeation chromatography satisfy the following expression (F7a):

$1.5 \le iPOS/iPC$ (F7a)

wherein iPOS represents an average content (mol) of linking groups of the polycarbonate blocks (A-1) and the polyorganosiloxane blocks (A-2), and iPC represents an average content (mol) of terminal groups of the polycarbonate blocks (A-1).

9. The polycarbonate-polyorganosiloxane copolymer according to claim 8, wherein the polycarbonate-polyorganosiloxane copolymer satisfies the following expression (F7b):

$$100 < iM1/iA \times 100 \quad \text{(F7b)}$$

wherein iM1 represents a ratio (iPOS/iPC) of iPOS to iPC in the polycarbonate-polyorganosiloxane copolymers each having a molecular weight determined by using the polycarbonate as a conversion reference of from 56,000 or more to 200,000 or less among the polycarbonate-polyorganosiloxane copolymers obtained through the separation of the polycarbonate-polyorganosiloxane copolymer by the gel permeation chromatography, and iA represents a ratio (iPOS/iPC) of iPOS to iPC in the polycarbonate-polyorganosiloxane copolymer.

10. The polycarbonate-polyorganosiloxane copolymer according to claim 9, wherein the polycarbonate-polyorganosiloxane copolymer satisfies the following expression (F8):

$$iM2 < iM1 \quad \text{(F8)}$$

wherein iM1 is as described above, and iM2 represents a ratio (iPOS/iPC) of iPOS to iPC in polycarbonate-polyorganosiloxane copolymers each having a molecular weight determined by using the polycarbonate as a conversion reference of from 16,000 or more to less than 56,000 among the polycarbonate-polyorganosiloxane copolymers obtained through the separation of the polycarbonate-polyorganosiloxane copolymer by the gel permeation chromatography.

11. The polycarbonate-polyorganosiloxane copolymer according to claim 10, wherein the polycarbonate-polyorganosiloxane copolymer satisfies the following expression (F9):

$$iM3 < iM2 \quad \text{(F9)}$$

wherein iM2 is as described above, and iM3 represents a ratio (iPOS/iPC) of iPOS to iPC in polycarbonate-polyorganosiloxane copolymers each having a molecular weight determined by using the polycarbonate as a conversion reference of from 4,500 or more to less than 16,000 among the polycarbonate-polyorganosiloxane copolymers obtained through the separation of the polycarbonate-polyorganosiloxane copolymer by the gel permeation chromatography.

12. A flame-retardant polycarbonate-based resin composition, comprising:
the polycarbonate-polyorganosiloxane copolymer (A) of claim 1;
an aromatic polycarbonate-based resin (B) except the polycarbonate-polyorganosiloxane copolymer (A); and
a flame retardant (C),
wherein the flame retardant (C) is blended in an amount of from 0.001 part by mass or more to 20 parts by mass or less with respect to 100 parts by mass of the polycarbonate-polyorganosiloxane copolymer (A) and the aromatic polycarbonate-based resin (B).

13. The polycarbonate-polyorganosiloxane copolymer according to claim 1, wherein the polyorganosiloxane blocks (A-2) have an average chain length of from 30 or more to 500 or less.

14. The polycarbonate-polyorganosiloxane copolymer according to claim 1, wherein the polyorganosiloxane blocks (A-2) have an average chain length of from 55 or more to 500 or less.

15. The polycarbonate-polyorganosiloxane copolymer according to claim 1, wherein the polyorganosiloxane blocks (A-2) have an average chain length of from 55 or more to 85 or less.

16. The polycarbonate-polyorganosiloxane copolymer according to claim 1, wherein a content of the polyorganosiloxane blocks (A-2) in the polycarbonate-polyorganosiloxane copolymer (A) is from 5 mass % or more to 70 mass % or less.

17. A polycarbonate-polyorganosiloxane copolymer, comprising:
polycarbonate blocks (A-1) each formed of a repeating unit represented by the following general formula (I), and
polyorganosiloxane blocks (A-2) each containing a repeating unit represented by the following general formula (II),
wherein the polycarbonate-polyorganosiloxane copolymer satisfies the following expression (F1a):

$$15 \leq wM1 \quad \text{(F1a)}$$

wherein wM1 represents an average content (mass %) of the polyorganosiloxane blocks (A-2) in polycarbonate-polyorganosiloxane copolymers each having a molecular weight determined by using a polycarbonate as a conversion reference of from 56,000 or more to 200,000 or less among polycarbonate-polyorganosiloxane copolymers obtained through separation of the polycarbonate-polyorganosiloxane copolymer by gel permeation chromatography;

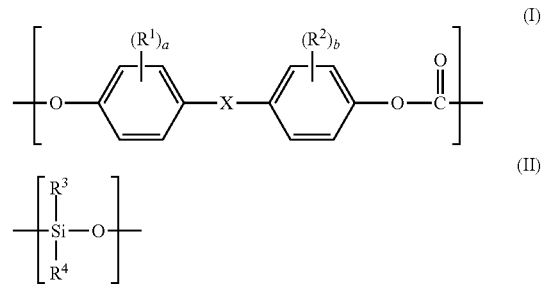

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4;
wherein the polycarbonate-polyorganosiloxane copolymer (A) has a viscosity-average molecular weight (Mv) of from 9,000 or more to 50,000 or less.

18. The polycarbonate-polyorganosiloxane copolymer according to claim 12, wherein the aromatic polycarbonate-based resin (B) contains a polycarbonate block including, in a main chain thereof, a repeating unit represented by the following general formula (III):

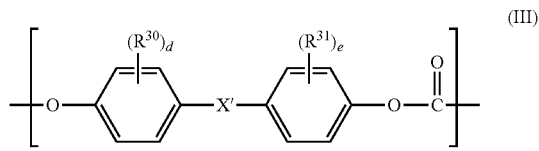

wherein $R^{30}$ and $R^{31}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "d" and "e" each independently represent an integer of from 0 to 4.

19. The flame-retardant polycarbonate-based resin composition according to claim 12, wherein a mass ratio "(A)/(B)" of the polycarbonate-polyorganosiloxane copolymer (A) to the aromatic polycarbonate-based resin (B) is from 0.1/99.9 to 99.9/0.1.

20. The flame-retardant polycarbonate-based resin composition according to claim 12, wherein a content of the polyorganosiloxane blocks (A-2) with respect to a total of the polycarbonate-polyorganosiloxane copolymer (A) and the aromatic polycarbonate-based resin (B) is from 0.1 mass % or more to 10 mass % or less.

21. The flame-retardant polycarbonate-based resin composition according claim 12, wherein a polycarbonate-based resin formed of the polycarbonate-polyorganosiloxane copolymer (A) and the aromatic polycarbonate-based resin (B) has a viscosity-average molecular weight (Mv) of from 9,000 or more to 50,000 or less.

22. The flame-retardant polycarbonate-based resin composition according to claim 12, wherein the flame retardant (C) comprises at least one selected from an organic alkali metal salt and an organic alkali earth metal salt.

23. The flame-retardant polycarbonate-based resin composition according to claim 22, wherein the flame retardant (C) comprises potassium perfluorobutanesulfonate.

24. The flame-retardant polycarbonate-based resin composition according to claim 22, wherein a content of the flame retardant (C) is from 0.001 part by mass or more to 1 part by mass or less with respect to 100 parts by mass of a resin formed of the polycarbonate-polyorganosiloxane copolymer (A) and the aromatic polycarbonate-based resin (B) except the polycarbonate-polyorganosiloxane copolymer (A).

25. The flame-retardant polycarbonate-based resin composition according to claim 12, wherein the flame retardant (C) comprises a phosphorus-based flame retardant.

26. The flame-retardant polycarbonate-based resin composition according to claim 25, wherein a content of the flame retardant (C) is from 0.1 part by mass or more to 20 parts by mass or less with respect to 100 parts by mass of a resin formed of the polycarbonate-polyorganosiloxane copolymer (A) and the aromatic polycarbonate-based resin (B) except the polycarbonate-polyorganosiloxane copolymer (A).

27. The flame-retardant polycarbonate-based resin composition according to claim 12, further comprising 0.01 part by mass or more to 1 part by mass or less of a flame retardant auxiliary (D) with respect to 100 parts by mass of a resin formed of the polycarbonate-polyorganosiloxane copolymer (A) and the aromatic polycarbonate-based resin (B).

28. The flame-retardant polycarbonate-based resin composition according to claim 27, wherein the flame retardant auxiliary (D) comprises a polytetrafluoroethylene.

29. The flame-retardant polycarbonate-based resin composition according to claim 27, wherein a content of the flame retardant auxiliary (D) is from 0.01 part by mass or more to 1 part by mass or less.

30. A molded article, which is obtained by molding the flame-retardant polycarbonate-based resin composition of claim 12.

31. The molded article according to claim 30, wherein the molded article comprises a casing for electrical and electronic equipment.

32. The molded article according to claim 30, wherein the molded article comprises a part for an automobile and a building material.

33. A flame-retardant polycarbonate-based resin composition, comprising:
the polycarbonate-polyorganosiloxane copolymer (A) of claim 2;
an aromatic polycarbonate-based resin (B) except the polycarbonate-polyorganosiloxane copolymer (A); and
a flame retardant (C),
wherein the flame retardant (C) is blended in an amount of from 0.001 part by mass or more to 20 parts by mass or less with respect to 100 parts by mass of the polycarbonate-polyorganosiloxane copolymer (A) and the aromatic polycarbonate-based resin (B).

34. A flame-retardant polycarbonate-based resin composition, comprising:
the polycarbonate-polyorganosiloxane copolymer (A) of claim 17;
an aromatic polycarbonate-based resin (B) except the polycarbonate-polyorganosiloxane copolymer (A); and
a flame retardant (C),
wherein the flame retardant (C) is blended in an amount of from 0.001 part by mass or more to 20 parts by mass or less with respect to 100 parts by mass of the polycarbonate-polyorganosiloxane copolymer (A) and the aromatic polycarbonate-based resin (B).

* * * * *